(12) United States Patent
Mori et al.

(10) Patent No.: US 12,065,590 B2
(45) Date of Patent: Aug. 20, 2024

(54) ADHESIVE COMPOSITION, LAMINATE AND OPTICAL ARTICLE COMPRISING THE LAMINATE

(71) Applicant: TOKUYAMA CORPORATION, Shunan (JP)

(72) Inventors: Katsuhiro Mori, Shunan (JP); Toshimitsu Hiraren, Shunan (JP); Junji Momoda, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 18/136,118

(22) Filed: Apr. 18, 2023

(65) Prior Publication Data

US 2023/0272252 A1    Aug. 31, 2023

Related U.S. Application Data

(62) Division of application No. 16/305,371, filed as application No. PCT/JP2017/021882 on Jun. 7, 2017, now abandoned.

(30) Foreign Application Priority Data

Aug. 2, 2016  (JP) ................................. 2016-151657
Oct. 27, 2016  (JP) ................................. 2016-211122
(Continued)

(51) Int. Cl.
*B32B 27/08*  (2006.01)
*B32B 7/12*  (2006.01)
(Continued)

(52) U.S. Cl.
CPC ............... *C09J 175/04* (2013.01); *B32B 7/12* (2013.01); *B32B 27/08* (2013.01); *B32B 27/32* (2013.01);
(Continued)

(58) Field of Classification Search
CPC ............ B32B 7/12; B32B 27/08; B32B 27/34
See application file for complete search history.

(56) References Cited

U.S. PATENT DOCUMENTS 5,258,482 A    11/1993 Jacobs et al.
2008/0094707 A1    4/2008 Tsukane et al.
(Continued)

FOREIGN PATENT DOCUMENTS

JP    2002-62423 A    2/2002
JP    2006-57089 A    3/2006
(Continued)

OTHER PUBLICATIONS

Brazilian Office Action for corresponding Brazilian Application No. 112018075837, dated Jun. 2, 2021.
(Continued)

*Primary Examiner* — Michael L Leonard
(74) *Attorney, Agent, or Firm* — Birch, Stewart, Kolasch & Birch, LLP

(57) ABSTRACT

To provide an adhesive composition capable of firmly bonding polymer sheets together, comprising:
(I) 100 parts by mass of an end-unreactive urethane urea resin; and
(III) 4.0 to 20 parts by mass of a polyisocyanate compound having at least two isocyanate groups in the molecule, wherein the polyisocyanate compound (III) contains (IIIA) a polyisocyanate compound having an isocyanate group bonded to secondary carbon and (IIIB) a polyisocyanate compound having 4 to 30 carbon atoms in the molecule other than the component (IIIA), and the amount of the component (IIIB) is 10 to 500 parts by mass based on 100 parts by mass of the component (IIIA).

6 Claims, 1 Drawing Sheet

(30) Foreign Application Priority Data

Feb. 3, 2017 (JP) .................................. 2017-018281
Mar. 17, 2017 (JP) .................................. 2017-052251

(51) Int. Cl.

| | |
|---|---|
| *B32B 27/12* | (2006.01) |
| *B32B 27/32* | (2006.01) |
| *B32B 27/34* | (2006.01) |
| *C08G 18/10* | (2006.01) |
| *C08G 18/20* | (2006.01) |
| *C08G 18/73* | (2006.01) |
| *C08G 18/75* | (2006.01) |
| *C08G 18/79* | (2006.01) |
| *C08L 75/06* | (2006.01) |
| *C09J 175/02* | (2006.01) |
| *C09J 175/04* | (2006.01) |
| *C09J 175/06* | (2006.01) |
| *G02B 5/23* | (2006.01) |
| *G02B 5/30* | (2006.01) |

(52) U.S. Cl.
CPC .............. *B32B 27/34* (2013.01); *C08G 18/10* (2013.01); *C08G 18/2018* (2013.01); *C08G 18/73* (2013.01); *C08G 18/755* (2013.01); *C08G 18/758* (2013.01); *C08G 18/792* (2013.01); *C08L 75/06* (2013.01); *C09J 175/02* (2013.01); *C09J 175/06* (2013.01); *G02B 5/23* (2013.01); *G02B 5/305* (2013.01); *B32B 2551/00* (2013.01)

(56) References Cited

U.S. PATENT DOCUMENTS

| | | |
|---|---|---|
| 2012/0277394 A1 | 11/2012 | Taniguchi et al. |
| 2013/0215488 A1 | 8/2013 | Hiraren et al. |
| 2014/0111859 A1* | 4/2014 | Duraes .................. G02B 1/105 427/163.1 |
| 2014/0340727 A1 | 11/2014 | Mori et al. |
| 2019/0004336 A1 | 1/2019 | Mori et al. |

FOREIGN PATENT DOCUMENTS

| | | |
|---|---|---|
| JP | 4739950 B2 | 8/2011 |
| JP | 4764350 B2 | 8/2011 |
| JP | 2011-174037 A | 9/2011 |
| JP | 2014-113761 A | 6/2014 |
| JP | 2016-169363 A | 9/2016 |
| WO | WO 2012/018070 A1 | 2/2012 |
| WO | WO 2013/099640 A1 | 7/2013 |
| WO | WO 2017/115874 A1 | 7/2017 |

OTHER PUBLICATIONS

English Translation of JP 2006-57089 (Mar. 2, 2006).
English Translation of JP 2013-33131 (Feb. 14, 2013).
English Translation of JP 2016-169363 (Sep. 23, 2016).
Extended European Search Report, dated Mar. 17, 2020, for corresponding European Application No. 17836615.9.
Final Office Action issued in U.S. Appl. No. 16/305,371, dated Sep. 8, 2022.
International Preliminary Report on Patentability and English translation of the Written Opinion of the International Searching Authority (forms PCT/IB/373 and PCT/ISA/237), dated Feb. 5, 2019, for corresponding International Application No. PCT/JP2017/021882.
International Search Report (form PCT/ISA/210), dated Sep. 5, 2017, for corresponding International Application No. PCT/JP2017/021882, with an English translation.
Non-Final Office Action issued in U.S. Appl. No. 16/305,371, dated Jan. 14, 2022.
Non-Final Office Action issued in U.S. Appl. No. 16/305,371, dated Jan. 18, 2023.
Non-Final Office Action issued in U.S. Appl. No. 16/305,371, dated May 16, 2022.
Restriction/Election issued in U.S. Appl. No. 16/305,371, dated Dec. 3, 2021.

* cited by examiner

ADHESIVE COMPOSITION, LAMINATE AND OPTICAL ARTICLE COMPRISING THE LAMINATE

This application is a Divisional of co-pending application Ser. No. 16/305,371, filed on Nov. 28, 2018, which is the National Stage Application under 35 U.S.C. § 371 of International Application No. PCT/JP2017/021882, filed on Jun. 7, 2017, which claims the benefit under 35 U.S.C. § 119(a) to Japanese Patent Application No. 2016-211122, filed on Oct. 27, 2016, Japanese Patent Application No. 2016-151657, filed on Aug. 2, 2016, Japanese Patent Application No. 2017-052251, filed on Mar. 17, 2017, and Japanese Patent Application No. 2017-018281, filed on Feb. 3, 2017, all of which are hereby expressly incorporated by reference into the present application.

TECHNICAL FIELD

The present invention relates to a novel adhesive composition. Particularly, it relates to a novel adhesive composition capable of firmly bonding polymer sheets together. Further, it relates to a novel laminate and novel optical article obtained by using this adhesive composition.

BACKGROUND ART

Mainly in the U.S., many plastic substrates comprising a transparent polycarbonate resin having excellent impact resistance have recently been used in optical articles such as sunglasses having antiglare properties. As a plastic substrate other than polycarbonate resins, a polyamide resin, for example, an alicyclic polyamide resin having an alicyclic group in the molecule such as cyclohexane is used.

Particularly, optical articles comprising an alicyclic polyamide resin have an advantage that they have excellent heat resistance and hardly produce an uneven color due to small birefringence. Further, an optical article such as a spectacle lens has an advantage that a lens comprising a polyamide resin as the main component is hardly affected by a plasticizer which bleeds out from a frame made of the polyamide resin.

To obtain an optical article by using a polymer sheet made of a polycarbonate resin or polyamide resin, many attempts have been made to provide functions to the optical article. For example, there is known a method in which a pair of polymer sheets are bonded together by means of an adhesive comprising a coloring matter. There is also known a method in which a polarizing sheet is interposed between a pair of polymer sheets and bonded to the polymer sheets by means of an adhesive to obtain a laminate. Laminates obtained by these methods have been developed as optical articles having a large number of functions. To produce a spectacle lens, in general, a resin layer is formed on the surface of the obtained processed product by injection molding after the obtained laminate is thermally bent.

To produce a laminate, for example, there is known a method in which a two-liquid type urethane-based resin adhesive obtained by reacting a main agent containing a prepolymer having a hydroxyl group at both ends with an auxiliary agent containing a compound having an isocyanate group is interposed between an alicyclic polyamide resin sheet and a polarizing sheet and between the polarizing sheet and an alicyclic polyamide resin sheet to bond these sheets together (refer to Patent Documents 1 and 2).

However, it was found from studies conducted by the inventors of the present invention that this two-liquid type urethane-based resin adhesive may not obtain sufficiently high adhesive strength and there is room for improvement to obtain high adhesive strength which is required nowadays. Especially when a polarizing sheet is interposed between alicyclic polyamide resin sheets to enhance functionality, adhesive strength tends to lower and therefore there is room for improvement.

As the urethane-based resin which can firmly bond polymer sheets together, there is known an adhesive comprising a urethane urea resin as the main component and a polyisocyanate compound having at least two isocyanate groups in the molecule (refer to Patent Documents 3 to 5). These documents teach that the end of the polymer chain of this urethane urea resin is neither an isocyanate group nor a group which can react with an isocyanate group, so-called "end-capped" (may be referred to as "end-unreactive urethane urea resin" hereinafter). It is considered that this end-unreactive urethane urea resin becomes a urethane urea resin having a crosslinked structure through a reaction between the urea bond (—R—NH—CO—NH—) in the molecule of the resin and the isocyanate group of the polyisocyanate compound in the presence of heat or moisture to exhibit high adhesive strength. In these methods, as the polyisocyanate compound having such a high effect, polyisocyanate compounds having an isocyanate group bonded to secondary carbon (for example, isomer mixtures of 4,4'-methylenebis(cyclohexylisocyanate) are enumerated.

By using the adhesive comprising a urethane urea resin as the main component described in Patent Documents 3 to 5, polycarbonate resin sheets and polyamide resin sheets can be firmly bonded together. However, as described above, optical articles having excellent durability, that is, laminates which are bonded firmly to achieve excellent durability (optical articles) are desired. It was found from studies conducted by the inventors that even the above methods have room for improvement. Especially when polyamide resin sheets, particularly alicyclic polyamide resin sheets which are often used in spectacle lenses are bonded together and when the alicyclic polyamide resin sheets and a polarizing sheet are bonded together, the development of an adhesive which can bond these sheets more firmly than the above methods has been desired. Also, the development of an adhesive which can bond a polarizing sheet containing a dichroic dye to polymer sheets more firmly has been desired.

PRIOR ART DOCUMENTS

Patent Documents

Patent Document 1: Japanese Patent No. 4739950
Patent Document 2: Japanese Patent No. 4764350
Patent Document 3: WO2012/018070
Patent Document 4: WO2013/099640
Patent Document 5: JP-A 2014-113761

DISCLOSURE OF THE INVENTION

Problem to be Solved by the Invention

It is therefore an object of the present invention to provide an adhesive composition capable of firmly bonding polymer sheets together. It is another object of the present invention to provide an adhesive composition capable of firmly bonding polyamide resin sheets or even a polarizing sheet as well as a laminate bonded through an adhesive layer made of the adhesive composition. It is still another object of the present invention to provide an adhesive composition capable of firmly bonding even a polarizing sheet containing a dichroic dye to a polymer sheet and a laminate bonded through an adhesive layer made of the adhesive composition.

Means for Solving the Problem

The inventors of the present invention conducted intensive studies to solve the above problem. To begin with, they thought that a urethane-based resin having a similar molecular chain, especially a urethane urea resin must be used as the main component to improve adhesion to a polyamide resin. In addition, it is hardly expected that part of the surface melts and adheres as the polyamide resin has high solvent resistance. Therefore, when the inventors studied the type of the auxiliary agent for firm bonding and the mixing ratio thereof, they found that the above problem could be solved by combining specific kinds of auxiliary agents, thereby accomplishing the present invention.

That is, the present invention is (1) an adhesive composition comprising 100 parts by mass of (I) an end-unreactive urethane urea resin (may be simply referred to as "component (I)" hereinafter) and 4.0 to 20 parts by mass of (III) a polyisocyanate compound having at least two isocyanate groups in the molecule (may be simply referred to as "component (III)" hereinafter), wherein the polyisocyanate compound (III) contains (IIIA) a polyisocyanate compound having an isocyanate group bonded to secondary carbon (may be simply referred to as "component (IIIA)" hereinafter) and (IIIB) a polyisocyanate compound having 4 to 40 carbon atoms in the molecule other than the component (IIIA), that is, a polyisocynate compound having no isocyanate group bonded to a secondary carbon atom (may be simply referred to as "component (IIIB)" hereinafter), and the amount of the component (IIIB) is 10 to 500 parts by mass based on 100 parts by mass of the component (IIIA).

The present invention may take the following modes. (2) The adhesive composition according to (1), wherein the above component (IIIB) is at least one polyisocyanate compound selected from the group consisting of hexamethylene diisocyanate, burette compounds of hexamethylene diisocyanate, isocyanurate compounds of hexamethylene diisocyanate and adduct compounds of hexamethylene diisocyanate.

(3) The adhesive composition according to (1) or (2) having a weight average molecular weight/number average molecular weight ratio indicative of the polydispersity of the above component (I) of 1.6 to 2.4.

(4) The adhesive composition according to any one of (1) to (3) further comprising (II) a coloring matter.

(5) The adhesive composition according to any one of (1) to (4), wherein the above component (II) contains a photochromic compound.

Further, the present invention may take the following modes in which the above adhesive composition is used as an adhesive layer.

(6) A laminate comprising a pair of alicyclic polyamide resin sheets which are bonded together through an adhesive layer made of the adhesive composition according to any one of (1) to (5).

(7) A laminate comprising a polarizing sheet which is interposed between a pair of alicyclic polyamide resin sheets and bonded to the alicyclic polyamide resin sheets through an adhesive layer made of the adhesive composition according to any one of (1) to (5).

(8) An optical article manufactured by further laminating a polyamide resin layer on the surface of at least one of the alicyclic polyamide resin sheets in the laminate according to (6) or (7).

(9) A laminate comprising a polarizing sheet containing a dichroic dye which is interposed between a pair of polymer sheets and bonded to the polymer sheets through an adhesive layer made of the adhesive composition according to any one of (1) to (5).

Effect of the Invention

The adhesive composition of the present invention can firmly bond polymer sheets together. Therefore, when it is used to bond resin sheets having optical transparency together, the obtained laminate becomes a firmly bonded optical article having high durability. The adhesive composition can firmly bond even a polarizing sheet (polyvinyl alcohol sheet) which has been difficult to be bonded and a sheet made of a polyamide resin (polyamide sheet), especially a sheet made of an alicyclic polyamide resin (alicyclic polyamide sheet).

Further, when a coloring matter such as a photochromic compound is mixed with the adhesive composition, as the obtained adhesive layer does not prevent the movability of the photochromic compound, it functions as an adhesive layer and photochromic layer.

As a result, the laminate obtained by bonding polymer sheets using the adhesive composition of the present invention can be used as an excellent optical article.

The adhesive composition can firmly bond even a polarizing sheet containing a dichroic dye to a polymer sheet. Therefore, laminates which can be used for various purposes can be produced by using the adhesive composition.

PRACTICAL EMBODIMENT OF THE INVENTION

Figure 1:
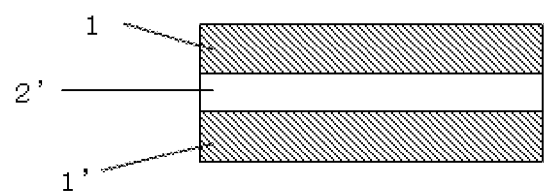
FIG. 1 shows a preferred example of a laminate obtained by using the adhesive composition of the present invention.

The present invention is an adhesive composition comprising (I) an end-unreactive urethane urea resin and a specific amount of (III) a polyisocyanate compound having at least two isocyanate groups in the molecule, wherein the polyisocyanate compound (III) contains a specific amount of (IIIA) a polyisocyanate compound having an isocyanate group bonded to secondary carbon and (IIIB) a specific amount of a polyisocyanate compound having 4 to 40 carbon atoms in the molecule other than the component (IIIA). A description is subsequently given of these components.

(1) End-Unreactive Urethane Urea Resin (Component (I))

In the present invention, the resin which is the main component of the adhesive composition is an end-unreactive urethane urea resin. Therefore, the adhesive composition of the present invention is not a generally known two-liquid type. That is, the adhesive composition is not a conventional two-liquid type adhesive which is obtained by reacting one liquid containing a resin having an isocyanate group as the main component with the other liquid containing a resin having a group able to react with an isocyanate group such as a hydroxyl group as the main component.

Although the reason that the adhesive composition of the present invention is excellent, especially that it can bond an alicyclic polyamide resin sheet and a polarizing sheet well is unknown, it is considered that an appropriate crosslinked structure is produced by reacting the main component having a urea bond in the molecule with a specific amount of a specific type of the polyisocyanate compound (III) which will be described in detail hereinunder with the result that a firmly bonded laminate can be produced.

In the present invention, the end-unreactive urethane urea resin (I) is a polymer which has a urea bond (—R—NH—CO—NH—) in the molecular chain and a group other than an isocyanate group and the group able to react with an isocyanate group at the end of the molecular chain. Examples of the group able to react with an isocyanate group include amino group (—NH$_2$ group and —NH(R) group), hydroxyl group (—OH group), mercapto group (—SH group: thiol group), carboxyl group [—C(=O)OH group] and acid chloride group [—C(=O)OCl group].

This component (I) can be produced as follows. To obtain high adhesion and an excellent effect when the adhesive composition comprises a coloring matter, it is preferably produced from the following components. That is, it is preferably a reaction product of (A) a urethane prepolymer having an isocyanate group at the end of the molecule, (B) a polyamine compound having at least two amino groups in the molecule and (C) a compound having one group able to react with an isocyanate group in the molecule. A urea bond is introduced into the molecule of the component (I) obtained from these components when the polyamine compound is used as the component (B) which is a raw material.

<Component A: Urethane Prepolymer Having an Isocyanate Group at the End of the Molecule>

A known urethane prepolymer may be used as the urethane prepolymer (component A) having an isocyanate group at the end of the molecule which is one of the constituent components of the above component (I). The urethane prepolymer is particularly preferably a reaction product of (A1) at least one polyol compound selected from the group consisting of polyols having at least two hydroxyl groups such as polyether polyols, polyester polyols, polycarbonate polyols and polycaprolactone polyols and (A2) a diisocyanate compound having two isocyanate groups in the molecule.

<Component A1: At Least One Polyol Compound Selected from the Group Consisting of Polyols Having at Least Two Hydroxyl Groups Such as Polyether Polyols, Polyester Polyols, Polycarbonate Polyols and Polycaprolactone Polyols>

The above polyol compound (component A1) has preferably 2 to 6 hydroxyl groups in one molecule as the produced end-unreactive urethane urea resin (component I) does not become a highly crosslinked material, more preferably 2 to 3 hydroxyl groups in the molecule when solubility in an organic solvent is taken into consideration. The above polyol compounds such as polyether polyols, polyester polyols, polycarbonate polyols and polycaprolactone polyols may be used alone or in combination of two or more. Out of these, polycarbonate polyols and polycaprolactone polyols are preferably used from the viewpoints of heat resistance, adhesion, weatherability and hydrolysis resistance. A detailed description is subsequently given of each component used as the component A1.

<Polycarbonate Polyol>

Examples of the polycarbonate polyol used as the component A1 include polycarbonate polyols obtained by phosgenating at least one low-molecular weight polyol such as ethylene glycol, 1,2-propanediol, 1,3-propanediol, 2-methyl-1,3-propanediol, 1,2-butanediol, 1,3-butanediol, 1,4-butanediol, 1,5-pentanediol, 1,6-hexanediol, 1,8-octanediol, 1,9-nonanediol, 1,10-decanediol, 3-methyl-1,5-pentanediol, 2-ethyl-4-butyl-1,3-propanediol, diethylene glycol, dipropylene glycol, neopentyl glycol, cyclohexane-1,4-diol, cyclohexane-1,4-dimethanol, dimeric acid diol, ethylene oxide or propylene oxide adducts of bisphenol A, bis(β-hydroxyethyl)benzene, xylylene glycol, glycerin, trimethylolpropane or pentaerythritol, or by transesterifying with a low-molecular weight carbonate such as ethylene carbonate, diethyl carbonate or diphenyl carbonate. Out of the above low-molecular weight polyols, low-molecular weight polyols having a linear alkylene chain are preferred from the viewpoints of the adhesion and heat resistance of the finally obtained end-unreactive urethane urea resin (component I). Adhesion tends to lower when polycarbonate polyols synthesized from low-molecular weight polyols having an alkyl group in the side chain are used as compared with low-molecular weight polyols having a linear alkylene chain.

The number average molecular weight of the polycarbonate polyol as the component A1 is preferably 400 to 2,000, more preferably 500 to 1,500, most preferably 600 to 1,200 from the viewpoint of the heat resistance of the finally obtained end-unreactive urethane urea resin (component I).

The polycarbonate polyol can be acquired as a reagent or industrially. Commercially available products of the polycarbonate polyol include the DURAL (registered trademark) series of Asahi Kasei Chemicals Corporation, the KURARAY POLYOL (registered trademark) series of Kuraray Co., Ltd., the PLACCEL (registered trademark) series of Daicel Chemical Industries, Ltd., the NIPPORAN (registered trademark) series of Nippon Polyurethane Industry Co., Ltd., and the ETERNACOLL (registered trademark) series of Ube Industries, Ltd.

<Polycaprolactone Polyol>

The polycaprolactone polyol used as the component A1 is preferably a compound obtained by the ring-opening polymerization of ε-caprolactone. The number average molecular weight of the polycaprolactone polyol as the component A1 is preferably 400 to 2,000, more preferably 500 to 1,500, most preferably 600 to 1,200 for the same reason as that for the polycarbonate polyol.

The polycaprolactone polyol can be acquired as a reagent or industrially. Commercially available products of the polycaprolactone polyol include the PLACCEL (registered trademark) series of Daicel Chemical Industries, Ltd.

<Polyether Polyol>

Examples of the polyether polyol include polyether polyol compounds obtained from a reaction between a compound having at least two active hydrogen-containing groups in the molecule and alkylene oxide, polymer polyols which are modified products of the polyether polyol compounds, urethane-modified polyether polyols and polyether ester copolymer polyols.

Examples of the compound having at least two active hydrogen-containing groups in the molecule include water and polyol compounds such as glycols having at least one hydroxyl group in the molecule including ethylene glycol, propylene glycol, butanediol, glycerin, trimethylolpropane, hexanetriol, triethanolamine, diglycerin, pentaerythritol, trimethylolpropane and hexanetriol. They may be used alone or in combination of two or more.

Examples of the above alkylene oxide include cyclic ether compounds such as ethylene oxide, propylene oxide and tetrahydrofuran. They may be used alone or in combination of two or more.

The number average molecular weight of the polyether polyol is preferably 400 to 2,000, more preferably 500 to 1,500, most preferably 600 to 1,200 for the same reason as that for the polycarbonate polyol.

The polyether polyol can be acquired as a reagent or industrially. Commercially available products of the polyether polyol include the EXCENOL (registered trademark) series and the EMULSTAR (registered trademark) of AGC Corporation, and the ADEKA POLYESTER series of ADEKA Corporation.

<Polyester Polyol>

Examples of the polyester polyol include polyester polyols obtained from a condensation reaction between a polyhydric alcohol and a polybasic acid. Examples of the above polyhydric alcohol include ethylene glycol, 1,2-propanediol, 1,3-butanediol, 1,4-butanediol, 3-methyl-1,5-pentanediol, 1,6-hexanediol, 3,3'-dimethylolheptane, 1,4-cyclohexane dimethanol, neopentyl glycol, 3,3-bis(hydroxymethyl)heptane, diethylene glycol, dipropylene glycol, glycerin and trimethylol propane. They may be used alone or in combination of two or more. Examples of the above polybasic acid include succinic acid, adipic acid, azelaic acid, sebacic acid, dodecanedicarboxylic acid, cyclopentanedicarboxylic acid, cyclohexanedicarboxylic acid, orthophthalic acid, isophthalic acid, terephthalic acid and naphthalenedicarboxylic acid. They may be used alone or in combination of two or more.

The number average molecular weight of the polyester polyol is preferably 400 to 2,000, more preferably 500 to 1,500, most preferably 600 to 1,200 for the same reason as that for the polycarbonate polyol.

The polyester polyol can be acquired as a reagent or industrially. Commercially available products of the polyester polyol include the POLYLITE (registered trademark) series of DIC Corporation, the NIPPORAN (registered trademark) series of Nippon Polyurethane Industry Co., Ltd. and the MAXIMOL (registered trademark) series of Kawasaki Kasei Chemicals Ltd.

<Component A2: Diisocyanate Compound Having Two Isocyanate Groups in the Molecule>

As the above diisocyanate compound (component A2), aliphatic diisocyanate compounds, alicyclic diisocyanate compounds, aromatic diisocyanate compounds and mixtures thereof are used. Out of these, aliphatic diisocyanate compounds and/or alicyclic diisocyanate compounds are preferably used from the viewpoint of weatherability. For the same reason, preferably, an aliphatic diisocyanate compound and/or an alicyclic diisocyanate compound account for 30 to 100 mass %, specifically 50 to 100 mass % of the component A2.

Examples of the diisocyanate compound which can be preferably used as the component A2 include aliphatic diisocyanate compounds such as tetramethylene-1,4-diisocyanate, hexamethylene-1,6-diisocyanate, octamethylene-1,8-diisocyanate and 2,2,4-trimethylhexane-1,6-diisocyanate; alicyclic diisocyanate compounds such as cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isophorone diisocyanate, norbornene diisocyanate, isomer mixtures of 4,4'-methylenebis(cyclohexylisocyanate), hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methylnonane, 1,1-bis (isocyanatomethyl)cyclohexane, 2-isocyanato-4-[(4-isocyanatocyclohexyl)methyl]-1-methyl cyclohexane, 2-(3-isocyanatopropyl)cyclohexyl isocyanate and norbornane diisocyanate; and aromatic diisocyanate compounds such as phenyl cyclohexylmethane diisocyanate, isomer mixtures of 4,4'-methylenebis(phenylisocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, xylylene diisocyanate, tetramethylxylylene diisocyanate, naphthalene diisocyanate, diphenyl ether diisocyanate, 1,3-diisocyanatomethyl benzene, 4,4'-diisocyanato-3,3'-dimethoxy(1,1'-biphenyl), 4,4'-diisocyanato-3,3'-dimethylbiphenyl, 1,2-diisocyantobenzene, 1,4-bis(isocyanatomethyl)-2,3,5,6-tetrachlorobenzene, 2-dodecyl-1,3-diisocyantobenzene, 1-isocyanato-4-[(2-isocyanatocyclohexyl)methyl]2-methylbenzene, 1-isocyanato-3-[(4-isocyanatophenyl) (methyl)-2-methylbenzene, 4-[(2-isocyanatophenyl)oxy)phenyl isocyanate and diphenylmethane diisocyanate.

Out of these, at least one diisocyanate compound selected from the group consisting of aliphatic diisocyanate compounds and alicyclic diisocyanate compounds accounts for preferably 30 to 100 mass %, more preferably 50 to 100 mass % of the diisocyanate compound as the component A2 from the viewpoint of the weatherability of the obtained end-unreactive urethane urea resin (component (I)) as described above. Preferred examples of the diisocyanate compound include tetramethylene-1,4-diisocyanate, hexamethylene-1,6-diisocyanate, octamethylene-1,8-diisocyanate, 2,2,4-trimethylhexane-1,6-diisocyanate, cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isophorone diisocyanate, norbornane diisocyanate, isomer mixtures of 4,4'-methylenebis(cyclohexylisocyanate), hexahydrotoluene-2,4-diisocyanate, hexahydrotoluene-2,6-diisocyanate, hexahydrophenylene-1,3-diisocyanate and hexahydrophenylene-1,4-diisocyanate. These diisocynate compounds may be used alone or in combination of two or more.

<(B) Polyamine Compound Having at Least Two Amino Groups in the Molecule>

The polyamine compound having at least two amino groups in the molecule (component B) is a polyamine compound having at least two amino groups (—NH$_2$ or —NH(R). R is an alkyl group, preferably an alkyl group having 1 to 5 carbon atoms) in the molecule.

The component B serves as a chain extender when the end-unreactive urethane urea resin (component (1)) is synthesized. A urea bond is introduced into a polyurethane resin by using the component B as the chain extender to obtain a polyurethane urea resin.

The molecular weight of the polyamine compound is preferably 50 to 300, more preferably 50 to 250, most preferably 100 to 220 to make the obtained end-unreactive urethane urea resin (component (I)) appropriately hard and retain excellent adhesion and heat resistance.

At least one compound selected from the group consisting of diamines and triamines can be preferably used as the polyamine compound which is the component B. Examples of the compound which is preferably used as the polyamine compound in the present invention include isophorone diamine, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, piperazine, N,N-bis(2-aminoethyl)piperazine, bis-(4-aminocyclohexyl)methane, bis-(4-amino-3-butylcyclohexyl)methane, 1,2-, 1,3- and 1,4-diaminocyclohexanes, norbornanediamine, hydrazine, dihydrazine adipate, phenylenediamine, 4,4'-diphenylmethane diamine, N,N'-diethyl ethylenediamine, N,N'-dimethyl ethylenediamine, N,N'-dipropyl ethylenediamine, N,N'-dibutyl ethylenediamine, N-methyl ethylenediamine, N-ethyl ethylenediamine, bis(hexamethylene)triamine and 1,2,5-pentanetriamine.

A diamine compound is particularly preferably used as the polyamine compound from the viewpoints of adhesion and heat resistance. The reason for this is presumed to be that the stiffness of the molecule becomes high and a hydrogen bond between molecular chains becomes strong since a urea bond is introduced by using the polyamine compound when the end-unreactive urethane urea resin (component (I)) is synthesized, thereby improving heat resistance. Further, it is presumed that, as the hydrogen bond between the molecular chains becomes strong due to the existence of the urea bond, oxygen contained in air hardly diffuses into the end-unreactive urethane urea resin (component (I)), thereby suppressing the photooxidation deterioration of the end-unreactive urethan urea resin. It is also assumed that adhesive strength is improved as the cohesive fracture of the resin hardly occurs as the hydrogen bond between the molecular chains becomes strong due to the existence of the urea bond.

Out of the above polyamine compounds, isophorone diamine, bis-(4-aminocyclohexyl)methane and norbornane diamine are preferably used, and bis-(4-aminocyclohexyl)methane is most preferably used from the viewpoints of water resistance and stability to a perspiration resistance test.

<(C) Compound Having One Group Able to React with an Isocyanate Group in the Molecule>

To synthesize the end-unreactive urethan urea resin (component (I)), a compound having one group able to react with an isocyanate group in the molecule (component C) is used in combination. By using this component C, the end-unreactive urethan urea resin (component (I)) having the capped end of the molecular chain is obtained. Examples of the group able to react with an isocyanate group are groups listed above.

A functionality imparting compound having at least one structure exhibiting weatherability in the molecule is preferred as the above component C. Examples of the functionality imparting structure include piperidine structure, hindered phenol structure, triazine structure and benzotriazole structure. Out of these, piperidine structure is preferred as it exhibits the most excellent effect.

By using this functionality imparting compound, the structure exhibiting weatherability can be introduced into the end-unreactive urethane urea resin (component (I)) with the result that an end-unreactive urethane urea resin (component (I)) having excellent functions such as optical stability, antioxidant property and ultraviolet absorbing property can be obtained.

A compound having a piperidine structure as a typical example of the compound used as the component C is described in detail hereinunder.

<Compound Having a Piperidine Structure>

As the compound having a piperidine structure used as the component C, a compound having a structure represented by the following formula (i) in the molecule is preferably used.

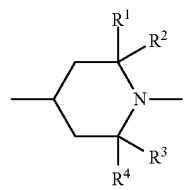

(i)

(In the above formula, $R^1$, $R^2$, $R^3$ and $R^4$ are each an alkyl group having 1 to 4 carbon atoms, particularly preferably methyl group.) A compound having a group able to react with an isocyanate group at the nitrogen atom or at the 4-position carbon atom of the above piperidine ring corresponds to the compound having a piperidine structure.

A description is subsequently given of a more specific compound.

A compound which can introduce a piperidine structure into the end of the end-unreactive urethane urea resin out of the compounds used as the above component C is preferably represented by the following formula (1).

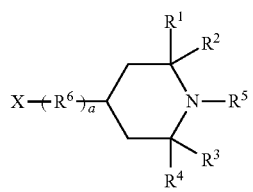

(1)

In the above formula, $R^1$, $R^2$, $R^3$ and $R^4$ are as defined in the above formula (i), $R^5$ is an alkyl group having 1 to 10 carbon atoms or hydrogen atom, $R^6$ is an alkylene group having 1 to carbon atoms or polymethylene group having 3 to 20 carbon atoms, "a" is 0 or 1, and X is a group able to react with an isocyanate group.

In the above formula (1), $R^1$, $R^2$, $R^3$ and $R^4$ are each independently an alkyl group having 1 to 4 carbon atoms. It is preferred that the four alkyl groups should be all methyl groups.

$R^5$ is an alkyl group having 1 to 10 carbon atoms or hydrogen atom. From the viewpoint of acquisition ease, it is preferably an alkyl group having 1 to 4 carbon atoms or hydrogen atom. Since $R^1$ to $R^4$ are alkyl groups having 1 to 4 carbon atoms, even when $R^5$ is a hydrogen atom, the nitrogen atom bonded to $R^5$ and the isocyanate group do not react with each other due to the influence of steric hindrance.

$R^6$ is an alkylene group having 1 to 20 carbon atoms or polymethylene group having 3 to 20 carbon atoms, preferably alkylene group having 1 to 10 carbon atoms or polymethylene group having 3 to 10 carbon atoms. "a" indicates the number of $R^6$'s. When "a" is 0, it should be understood that X is directly bonded to the piperidine structure.

X is a group able to react with an isocyanate group, preferably amino group, hydroxyl group, carboxyl group or thiol group. Out of these, amino group and hydroxyl group are preferred from the viewpoints of reactivity with an isocyanate group and acquisition ease.

Examples of the compound represented by the above formula (1) include 1,2,2,6,6-pentamethyl-4-hyroxypiperidine, 1,2,2,6,6-pentamethyl-4-aminopiperidine, 2,2,6,6-tetramethyl-4-hydroxypiperidine, 2,2,6,6-tetramethyl-4-aminopiperidine, 1,2,2,6,6-pentamethyl-4-aminomethylpiperidine and 1,2,2,6,6-pentamethyl-4-aminobutylpiperidine.

<Other Components C>

As the above component C, ordinary amines, alcohols, thiols and carboxylic acids may be used in addition to the above compound having a piperidine structure which is aimed to improve weatherability. These compounds can inactivate the end of the component (I) as it has one group able to react with an isocyanate in the molecule.

Compounds represented by the following formulas (2) and (3) are preferred as the other components C used in the present invention.

(2)

In the above formula, $R^7$ is an alkyl group having 1 to 20 carbon atoms, aryl group, aralkyl group, alkyloxycarbonyl group or hydrogen atom, and $R^8$ is an alkyl group having 1 to 20 carbon atoms, aryl group, aralkyl group or ester group.

When a compound in which $R^7$ is a hydrogen atom is used as the component C, the end of the polyurethane urea resin as the component (I) is a —NH($R^8$) group which does not react with another polymer and an isocyanate compound substantially. Therefore, the —NH($R^8$) group is not the group able to react with an isocyanate group.

In the above formula (2), $R^7$ is an alkyl group having 1 to 20 carbon atoms, aryl group, aralkyl group, alkyloxycarbonyl group or hydrogen atom. $R^7$ is particularly preferably an alkyl group having 1 to 10 carbon atoms, aryl group, aralkyl group, alkyloxycarbonyl group or hydrogen atom. The above aryl group and the aralkyl group may have an alkyl group having 1 to 5 carbon atoms or halogen atom as a substituent.

Preferred examples of $R^7$ include methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group and hydrogen atom.

$R^8$ is an alkyl group having 1 to 20 carbon atoms, aryl group, aralkyl group or alkyloxycarbonyl group. $R^8$ is particularly preferably an alkyl group having 1 to 10 carbon atoms, aryl group, aralkyl group or alkyloxycarbonyl group. The above aryl group may have an alkyl group having 1 to 5 carbon atoms or halogen atom as a substituent.

Preferred examples of $R^8$ include methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group and carboxypropyl group.

A compound represented by the following formula (3) may also be preferably used.

Z—$R^9$ (3)

In the above formula, $R^9$ is an alkyl group having 1 to 20 carbon atoms, aryl group, aralkyl group or alkyloxycarbonyl group, and Z is a hydroxyl group, carboxyl group or thiol group.

In the above formula (3), $R^9$ is an alkyl group having 1 to 20 carbon atoms, aryl group, aralkyl group or alkyloxycarbonyl group, preferably an alkyl group having 1 to 10 carbon atoms, aryl group, aralkyl group or alkyloxycarbonyl group. The aryl group and the aralkyl group may have an alkyl group having 1 to 5 carbon atoms or a halogen atom as a substituent. The preferred group is an alkyl group having 1 to 5 carbon atoms, phenyl group or phenyl group having a halogen atom. Preferred examples of $R^9$ include methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group and carboxypropyl group.

Z in the above formula (3) is a group able to react with an isocyanate group, specifically hydroxyl group, carboxyl group or thiol group, preferably hydroxyl group.

Examples of the compounds represented by the above formulas (2) and (3) include amines such as methylamine, ethylamine, propylamine, isopropylamine, butylamine, tert-butylamine, pentylamine, hexylamine, heptylamine, 4-heptylamine, octylamine, 1,1-dipropylbutylamine, phenylamine, benzylamine, dimethylamine, diethylamine, dipropylamine, diisopropylamine, dibutylamine, di-tert-butylamine, dipentylamine, dihexylamine, diheptylamine, dioctylamine, methylethylamine, methylbutylamine, methylpentylamine, methylhexylamine, methylheptylamine, methyloctylamine, ethylpropylamine, ethylbutylamine, ethylpentylamine, ethylhexylamine, ethylheptylamine, ethyloctylamine, propylbutylamine, isopropylbutylamine, propylpentylamine, propylhexylamine, propylheptylamine and propyloctylamine; alcohols such as methanol, ethanol, propanol, isopropanol, butanol, 2-butanol, tert-butyl alcohol, pentyl alcohol, hexyl alcohol, heptyl alcohol, octyl alcohol, nonyl alcohol, decanol and 2-decanol; thiols such as methanethiol, ethanethiol, 1-propanethiol, 2-propanethiol, 1-butanethiol, 2-butanethiol, propanethiol, hexanethiol, heptanethiol, octanethiol, dodecanethiol, 2-methyl-1-butanethiol, 2-methylpropanethiol, 3-methyl-2-butenethiol, 1,1-dimethylheptanethiol, cyclohexanethiol, cyclopentanethiol, benzenethiol, benzenemethanethiol and 2,6-dimethylbenzenethiol; and carboxylic acids such as acetic acid, propionic acid, butyric acid, pentanoic acid, hexanoic acid, heptanoic acid, octanoic acid, nonanoic acid, decanoic acid and dodecanoic acid.

The above components C may be used alone or in combination of two or more. Out of these, a compound having a piperidine structure is preferably used to improve the durability of the end-unreactive urethane urea resin.

<Contents of Components A1, A2, B and C in End-Unreactive Urethane Urea Resin>

In the present invention, the weight ratio of the components constituting the end-unreactive urethane urea resin (component (I)), that is, the component A1, A2, B and C is preferably the following ratio in consideration of the heat resistance and bonding strength of an adhesive layer to be formed.

That is, when the total number of moles of hydroxyl groups contained in the component A1 is represented by n1, the total number of moles of isocyanate groups contained in the component A2 is represented by n2, the total number of moles of amino groups contained in the component B is represented by n3, and the total number of moles of groups able to react with an isocyanate group contained in the component C (specifically, amino group, hydroxyl group, mercapto group and/or carboxyl group) is represented by n4, n1:n2:n3:n4=0.4 to 0.8/1.0/0.19 to 0.59/0.01 to 0.2, particularly preferably 0.45 to 0.75/1.0/0.23 to 0.53/0.02 to 0.15, most preferably 0.65 to 0.75/1.0/0.23 to 0.33/0.02 to 0.1. n1~n4 can be each obtained as the product of the number of moles of the compound used as each component and the number of groups existent in one molecule of the compound.

The above end-unreactive urethane urea resin (component (I)) has no reactive group at the end. That is, the content of each component in the end-unreactive urethane urea resin must satisfy n2=n1+n3+n4. Therefore, even at the time of production, the resin is preferably produced to satisfy n2=n1+n3+n4. When the total number of moles of n1, n3 and n4 (n1+n3+n4) is larger than n2, unreacted components A1, B and C should be removed by reprecipitation.

<End-Unreactive Urethane Urea Resin Having a Polydispersity (Weight Average Molecular Weight/Number Average Molecular Weight Ratio) of 1.6 to 2.4; Component (I)>

In the present invention, the above end-unreactive urethane urea resin preferably has a polydispersity (weight average molecular weight/number average molecular weight ratio) of 1.6 to 2.4. By using an adhesive composition comprising the end-unreactive urethane urea resin having a narrow range of polydispersity, a laminate bonded by using the adhesive composition exhibits excellent adhesion, especially excellent adhesion at a high temperature.

Although the reason that this effect is obtained is unknown, the inventors of the present invention presume as follows. That is, since the polydispersity (weight average molecular weight/number average molecular weight ratio) is in the range of 1.6 to 2.4, the amount of a low-molecular weight material can be reduced, thereby stabilizing heat resistance. Further, it is considered that physical interaction between molecules due to the influence of the low-molecular weight urethane urea resin, that is, the reduction of entanglement between the molecules of a polymer chain can be suppressed. As a result, it is presumed that fracture within an adhesive layer obtained by adding a specific amount of the specific component (III) which will be detailed hereinafter, that is, cohesive fracture can be suppressed, thereby improving adhesion.

As the polydispersity becomes lower, that is, closer to 1.0, the effect of the present invention tends to appear stronger. It is considered that it is substantially difficult to obtain an end-unreactive urethane urea resin having a polydispersity of less than 1.6 by an industrial production method. Meanwhile, when the polydispersity is higher than 2.4, the softening start temperature tends to become low due to the influence of a low-molecular weight material. Therefore, as compared with a resin having a narrow range of polydispersity, the resin tends to become inferior in heat resistance and adhesion at a high temperature. Due to the influence of a high-molecular weight material, the viscosity when the resin is dissolved in an organic solvent greatly rises as compared with a resin having a narrow range of polydispersity, thereby making coating difficult. From the viewpoints of high adhesive strength, heat resistance and coatability, the polydispersity of the end-unreactive urethane urea resin used in the present invention is more preferably in the range of 1.8 to 2.2.

The molecular weight of the above end-unreactive urethane urea resin is not particularly limited. From the viewpoints of adhesive strength and heat resistance, the number average molecular weight of the resin is preferably 5,000 to 100,000, more preferably 8,000 to 50,000, particularly preferably 10,000 to 40,000.

The number average molecular weight and weight average molecular weight of the above end-unreactive urethane urea resin are values obtained by measuring a 1.0% dimethylformamide (DMF) solution as a urethane urea resin sample solution in terms of polyethylene oxide by gel permeation chromatography (GPC) using the two Shodex KD-806M columns (manufactured by Showa Denko K.K.) connected in series, a LiBr (10 mmol/L)/DMF solution as an eluant having a flow rate of 1 ml/min and an RI detector and calculated by using the Empower Personal GPC Option GPC analyzing software of Nippon Waters Corporation. The polydispersity is a value calculated from weight average molecular weight/number average molecular weight which are obtained by the above methods.

To obtain the end-unreactive urethane urea resin (component (I)) by reacting the above components A1, A2, B and C, a so-called "one-shot method" or prepolymer method may be employed. To obtain the end-unreactive urethane urea resin efficiently by controlling the polydispersity, the prepolymer method is preferably employed. According to the production method which will be described hereinafter, the end-unreactive urethane urea resin whose polydispersity satisfies the above range can be easily produced.

<Production Method of End-Unreactive Urethane Urea Resin (Component (I))>
<Production Method of Urethane Prepolymer (A)>

In the present invention, the above end-unreactive urethane urea resin can be generally produced from a reaction between a urethane prepolymer and a polyamine such as diamine. The urethane prepolymer (component A) can be produced from a reaction (to be referred to as "prepolymer reaction" hereinafter) between the above polyol compound (component A1) and the above diisocyanate compound (component A2).

The above urethane prepolymer (component A) is preferably a urethane prepolymer having an isocyanate group at the end by setting n1:n2=0.4/1.0 to 0.8/1.0 when the total number of moles of hydroxyl groups contained in the component A1 is represented by n1 and the total number of moles of isocyanate groups contained in the component A2 is represented by n2.

The addition order when the component A1 and the component A2 are reacted with each other is not particularly limited. The component A1 and the component A2 may be added additionally during the reaction as required.

A reaction between the component A1 and the component A2 is preferably carried out in the presence or non-presence of an organic solvent preferably in an inert gas atmosphere such as nitrogen or argon at a reaction temperature of 70 to 130° C. When the reaction temperature is lower than 70° C., the reaction is not completed and when the reaction temperature is higher than 130° C., part of the component A1 decomposes with the result that a polyurethane urea resin having desired physical properties is not obtained. The reaction time may be 0.5 to 24 hours though it changes according to the charge ratio of the components A1 and A2 and the reaction temperature.

As the organic solvent, organic solvents such as acetone, methyl ethyl ketone, methyl isobutyl ketone, diethyl ketone, cyclohexanone, dioxane, toluene, hexane, heptane, ethyl acetate, butyl acetate, dimethyl formamide (DMF), dimethyl sulfoxide (DMSO) and tetrahydrofuran (THF) may be used. These organic solvents may be used alone or in combination of two or more.

When the organic solvent is used, the amount thereof is preferably not more than 200 parts by mass based on 100 parts by mass of the total of the components A1 and A2. When the amount of the organic solvent is larger than 200 parts by mass, the reaction time between the components A1 and A2 becomes long, whereby part of the component A1 may decompose.

Before the reaction, to prevent a reaction between the isocyanate group contained in the diisocyanate compound and water which is an impurity, the reaction reagents and the solvent are preferably dehydrated and fully dried in advance. When the above reaction is carried out, a catalyst such as dibutyltin dilaurate, dimethyl imidazole, triethylenediamine, tetramethyl-1,6-hexadiamine, tetramethyl-1,2-ethanediamine or 1,4-diazabicyclo[2,2,2]octane may be used. The amount of the catalyst is preferably 0.001 to 1 part by mass based on 100 parts by mass of the component A.

<Method of Producing Urethane Urea Resin from Urethane Prepolymer (A)>

The urethane urea resin can be produced from a reaction between the urethane prepolymer and a polyamine such as diamine. To produce the urethane prepolymer by the above method, a polyamine compound as the component B is added to the reaction solution after the above prepolymerization reaction, thereby making it possible to produce the urethan urea resin continuously.

Other reaction conditions in the production method of the above urethane urea resin are suitably determined in consideration of production equipment. In general, the reaction may be carried out in the presence of an organic solvent in an inert gas atmosphere such as nitrogen or argon as required at a reaction temperature of preferably −20 to 40° C., more preferably −10 to 20° C.

As the organic solvent for the production of the above urethane urea resin, acetone, methyl ethyl ketone, methyl isobutyl ketone, diethyl ketone, cyclohexanone, dioxane, toluene, hexane, heptane, ethyl acetate, butyl acetate, dimethyl formamide (DMF), dimethyl sulfoxide (DMSO), tetrahydrofuran (THF), alcohol-based organic solvents such as methanol, ethanol, isopropyl alcohol, t-butanol, 2-butanol, n-butanol, ethylene glycol monomethyl ether, ethylene glycol monoethyl ether, ethylene glycol mononormal propyl ether, ethylene glycol monoisopropyl ether, ethylene glycol monobutyl ether, ethylene glycol mono-t-butyl ether, propylene glycol monomethyl ether, propylene glycol monoethyl ether, propylene glycol mononormal propyl ether, propylene glycol monoisopropyl, propylene glycol mononormal butyl ether and propylene glycol mono-t-butyl ether may be used. These organic solvents may be used alone or in combination of two or more.

The amount of the above organic solvent is preferably 130 to 800 parts by mass, more preferably 150 to 500 parts by mass based on 100 parts by mass of the total of the finally obtained polyurethane urea resin from the viewpoints of an efficient reaction and the influence of the residual organic solvent.

Before the reaction, to prevent a reaction between the isocyanate group in the reaction system and water which is an impurity, the reaction reagents and the organic solvent are preferably dehydrated and fully dried in advance. For the above reaction, a catalyst such as dibutyltin dilaurate, dimethyl imidazole, triethylenediamine, tetramethyl-1,6-hexadiamine, tetramethyl-1,2-ethanediamine or 1,4-diazabicyclo[2,2,2]octane may be newly added and may be used as it is without being removed when it is used in the prepolymer reaction. The amount of the catalyst is preferably 0.001 to 1 part by mass based on 100 parts by mass of the total of the urethane urea resin.

<Method of Producing End-Unreactive Urethane Urea Resin from Urethane Urea Resin>

To synthesize the above end-unreactive urethane urea resin (component (I)), the compound having one group able to react with an isocyanate group in the molecule (component C) is used. By using this component C, the component (I) having the capped end of the molecular chain is obtained.

As the method of obtaining the urethane urea resin having the capped end of the molecular chain (component (I)) (may also be referred to as "end modification reaction" hereinafter), a method in which, after the end of a reaction between the above components A and B, the component C which has been diluted with an organic solvent as required is added dropwise to a reaction solution containing the urethane urea resin having an isocyanate group at the end dissolved in the organic solvent is preferred. When an alcohol-based organic solvent which has been added for the reaction between the components A and B is used as the component C in the end modification reaction, the component C does not need to be newly added.

The above end modification reaction is carried out in the presence of an organic solvent in an inert gas atmosphere such as nitrogen or argon as required. The reaction temperature may be −20 to 30° C. which is the same temperature range as the reaction between the above components A and B when the group able to react with an isocyanate group contained in the component C is an amino group. When the group able to react with an isocyanate group contained in the component C is not an amino group, the reaction is preferably carried out at a temperature of higher than 30° C. to 130° C. as the reaction speed with the isocyanate group is low.

The reaction time is 0.5 to 3 hours when the group able to react with an isocyanate group contained in the component C is an amino group and 1 to 24 hours when the group able to react with an isocyanate group contained in the component C is not an amino group.

The organic solvent may be the same as that used in the above prepolymer reaction and the reaction between the components A and B. As a matter of course, the end modification reaction may be carried out while the organic solvent used in the above prepolymer reaction and the reaction between the components A and B is contained.

The amount of the organic solvent in the end modification reaction is preferably 130 to 800 parts by mass based on the 100 parts by mass of the total of the finally obtained component A.

Before the reaction, to prevent a reaction between an isocyanate group contained in the reaction system and water which is an impurity, the reaction reagents and the organic solvent are preferably dehydrated and fullydried in advance. For the above reaction, a catalyst such as dibutyltin dilaurate, dimethyl imidazole, triethylenediamine, tetramethyl-1, 6-hexadiamine, tetramethyl-1,2-ethanediamine or 1,4-diazabicyclo[2,2,2]octane may be newly added and may be used as it is without being removed when the catalyst is used in the prepolymer reaction. The amount of the catalyst is preferably 0.001 to 1 part by mass based on 100 parts by mass of the total of the component A.

<Method of Producing End-Unreactive Urethane Urea Resin Having a Polydispersity (Weight Average Molecular Weight/Number Average Molecular Weight Ratio) of 1.6 to 2.4>

To produce the end-unreactive urethane urea resin having a polydispersity (weight average molecular weight/number average molecular weight ratio) of 1.6 to 2.4 as described above, at the time of reacting the urethane prepolymer (component A) with the polyamine compound (component B), the time ($\theta_M$) of completely mixing the components A and B together is set to preferably not longer than 30 seconds, more preferably not longer than 15 seconds.

The complete mixing time ($\theta_M$) is an index indicative of mixing characteristics in a stirring tank (such as a reactor vessel) and obtained from [n·$\theta_M$-Re curve] which shows the relationship between n·$\theta_M$ (n is the number of revolutions (1/sec) of the stirring blade) and Re (Reynolds number; index indicative of the turbulence of a liquid). The complete mixing time ($\theta_M$) and the n·$\theta_M$-Re curve are described, for example, in the technical report of Sumitomo Heavy Industries, Ltd., Vol. 35, No. 104, August, 1987, p. 74-78, JP-A 61-200842 and JP-A 6-312122.

As means of setting the complete mixing time ($\theta_M$) to not longer than 30 seconds, any suitable method is employed. Examples of the method include one in which a baffle plate is installed in a stirring tank (such as a reactor vessel) to generate turbulence and one in which any suitable stirring blade is used. As the suitable stirring blade, a Maxblend blade or a full-zone blade is used.

When the urethane prepolymer is produced by the above method, the urethane urea resin can be produced continuously by adding the component B to the reaction solution after the above prepolymerization reaction.

Other reaction conditions in the production method of the urethane urea resin having the above range of polydispersity can be suitably determined in consideration of production equipment. With a view to obtaining a urethane urea resin having a narrow range of polydispersity, the reaction is preferably carried out in the presence of an organic solvent in an inert gas atmosphere such as nitrogen or argon as required at a reaction temperature of preferably −20 to 40° C., more preferably −10 to 20° C. When the reaction temperature is lower than −20° C., viscosity rises in the latter half of a chain extension reaction, whereby agitation tends to become unsatisfactory. When the reaction temperature is higher than 40° C., a urea bond forming reaction is accelerated and the components A and B react with each other right after their contact, thereby making the reaction non-uniform and widening polydispersity. A reaction time at the above reaction temperature of 0.5 to 3 hours suffices.

The urethane urea resin having a polydispersity of 1.6 to 2.4 can be produced under the above conditions. When the obtained urethane urea resin becomes an end-unreactive urethane urea resin, it can be used as the component (I) directly. If the end of the urethane urea resin is a reactive group, the end should be capped by the method described in <method of producing end-unreactive urethane urea resin from urethane urea resin>. Polydispersity is not changed by capping the end.

The end-unreactive urethane urea resin which will become the main component of the adhesive composition of the present invention can be produced by the above method. A description is subsequently given of the polyisocyanate compound having at least two isocyanate groups in the molecule (III).

<(III) Polyisocyanate Compound Having at Least Two Isocyanate Groups in Molecule (Component (III))>

The adhesive composition of the present invention comprises a specific amount of the component (III). The component (III) contains a specific amount of (IIIA) a polyisocyanate compound having an isocyanate group bonded to secondary carbon (component (IIIA) and (IIIB) a polyisocyanate compound having 4 to 40 carbon atoms in the molecule (component (IIIB)) other than the component (IIIA) The above component (III) preferably has 2 to 3 isocyanate groups in the molecule when the storage stability of the adhesive resin composition is taken into consideration.

The molecular weight of the above component (III) is not particularly limited but preferably lower than 1,000. When the molecular weight of the component (III) is not lower than 1,000, the heat resistance and film strength of the obtained adhesive layer tend to deteriorate. The reason for this is considered to be that when the component (III) having a high molecular weight is used, the number of bonds between isocyanate groups tends to increase with the result that the distance between crosslinking points becomes long even when a crosslinked structure is formed, whereby heat resistance does not improve much and adhesion does not improve fully. Therefore, the molecular weight of the component (III) is preferably lower than 1,000, more preferably not higher than 800, most preferably not higher than 550. This component (III) is preferably not a polymer as described above. Therefore, the molecular weight of the component (III) is the molecular weight of the component (III) itself. The lower limit of the molecular weight of the component (III) is the molecular weight of the individual compound and not particularly limited but preferably 100.

Since the component (III) has at least two isocyanate groups in the molecule, it is considered that when an adhesive layer is to be formed, the component (III) reacts with the component (I) to produce a urethane urea resin having a crosslinked structure. Or/further, it is considered that some of the isocyanate groups contained in the molecule of the component (III) hydrolyze to become an amine which reacts with an isocyanate group contained in the molecule of another component (III), thereby producing a urea resin in the component (I). Due to the formation of this crosslinked structure and/or the new urea resin in the component (I), the heat resistance of the adhesive layer improves and cohesive fracture hardly occurs. As a result, it is considered that the effect of improving adhesion becomes large. This effect is more excellent than when an ordinary two-liquid type polyurethane resin is used.

A detailed description of the formation of the above crosslinked structure and/or the new urea resin is given below. The effect of improving heat resistance and adhesion when the component (III) is added to the component (I) is obtained after a laminate is formed by using an adhesive composition comprising these (the adhesive layer is completely formed). Stated more specifically, it is considered that, right after the laminate is formed by using the adhesive composition comprising the component (I) and the component (III), the effect of improving heat resistance and adhesion is obtained by supplying heat and moisture. That is, one isocyanate group of a component (III) reacts with the urethane bond or urea bond of the component (I) by heat. Then, it is considered that, in a moisture reaction (reaction in the presence of water), the remaining isocyanate group(s) of the component (III) bonded to the component (I) and some of the isocyanate groups of a component (III) remaining free hydrolyze by moisture to produce an amine, thereby promoting a crosslinking reaction. Or/further, it is considered that some of the isocyanate groups of the component (III) remaining free hydrolyze by moisture to produce an amine which reacts with the isocyanate group of another component (III) remaining free, thereby producing a new urea resin in the component (I).

To develop the above effect more so as to bond a polyamide resin sheet having high solvent resistance and a polarizing sheet which is hardly bonded to another sheet firmly, the above component (III) must contain (IIIA) a polyisocyanate compound having an isocyanate group bonded to secondary carbon (component (IIIA)) and (IIIB) a polyisocyanate compound having 4 to 40 carbon atoms in the molecule (component (IIIB) other than the component (IIIA). Although the component (III) may contain a polyisocyanate compound other than the component (IIIA) and the component (IIIB), it preferably consists of the component (IIIA) and the component (IIIB) in consideration of the productivity, storage stability and adhesion of the adhesive composition itself.

<Component (IIIA)>

The adhesive composition of the present invention comprises a specific amount of (IIIA) the polyisocyanate compound having an isocyanate group bonded to secondary carbon. By using the component (IIIA), the heat resistance and adhesion of the adhesive layer can be improved.

Examples of the component (IIIA) include isomer mixtures of 4,4'-methylenebis(cyclohexylisocyanate), cyclobutane-1,3-diisocyanate, cyclohexane-1,3-diisocyanate, cyclohexane-1,4-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate and trimer of isophorone diisocyanate (isocyanurate compound). They may be used alone or in combination of two or more. Out of these, isomer mixtures of 4,4'-methylenebis(cyclohexylisocyanate) are preferably used.

When the adhesive composition of the present invention comprises the component (IIIB) in addition to the above component (IIIA), it exhibits an excellent effect.

<Component (IIIB)>

The adhesive composition of the present invention comprises a polyisocyanate compound having 4 to 40 carbon atoms in the molecule other than the above component (IIIA), that is, a polyisocyanate compound having no isocyanate group bonded to a secondary carbon atom (component (IIIB)). Since this component (IIIB) has 4 to 40 carbon atoms, it has a relatively soft group (having high movability). In consideration of adhesion, storage stability and handling ease, the component (IIIB) preferably has 15 to 30 carbon atoms. Particularly preferably, the component (IIIB) has an alkylene group having 4 to 10 carbon atoms in the molecule. A polyisocyanate compound having at least two isocyanate groups in the molecule is such an example.

Examples of the component (IIIB) include hexamethylene diisocyanate, burette compounds of hexamethylene diisocyanate, isocyanurate compounds of hexamethylene diisocyanate and adducts compounds of hexamethylene diisocyanate (component (IIIB)). They may be used alone or in combination of two or more. A polyisocyanate compound selected from the group consisting of burette compounds of hexamethylene diisocyanate and isocyanurate compounds of hexamethylene diisocyanate is preferably used.

<Mixing Ratio of Component (III)>

In the present invention, the mixing ratio of the component (III) is as follows. That is, from the viewpoints of the adhesion and heat resistance of the obtained adhesive layer, the amount of the component (III) must be 4.0 to 20 parts by mass based on 100 parts by mass of the component (I). When the amount of the component (III) falls within this range, the obtained adhesive layer exhibits an excellent effect. When the amount is too small, a satisfactory adhesion and heat resistance improving effect is not obtained. When the amount is too large, the adhesive layer tends to become clouded and deteriorate in adhesion. The adhesive composition of the present invention may comprise a photochromic compound which is detailed hereinbelow. In this case, when the amount of the component (III) is too large, the durability of the photochromic compound degrades. To further improve adhesion between polymer sheets, the amount of the component (III) is preferably 6.0 to 17.5 parts by mass, more preferably 7.0 to 15.0 parts by mass based on 100 parts by mass of the component (I). When different kinds of the components (III) are used, the total amount of the components (III) should fall within the above range. When the component (III) consists of the component (IIIA) and the component (IIIB), the amount of the component (III) is the total amount of the component (IIIA) and the component (IIIB).

The amount of the isocyanate group of the component (III) is preferably 1.0 to 10.0 parts by mass, more preferably 1.5 to 6.0 parts by mass, most preferably 2.0 to 5.0 parts by mass based on 100 parts by mass of the component (I). The amount of the isocyanate group can be obtained from the molecular weight of the component (III), the number of isocyanate groups per molecule and the molecular weight of the isocyanate group. As a matter of course, when different kinds of components (III) are used, the total amount of the isocyanate groups of the different kinds of the components (III) should fall within the above range. When the component (III) consists of the component (IIIA) and the component (IIIB), the amount of the isocyanate group of the component (III) is the total amount of the isocyanate groups of the component (IIIA) and the component (IIIB).

<Mixing Ratio of Component (IIIA) and Component (IIIB)>

In the present invention, the total amount of the component (IIIA) and the component (IIIB) must satisfy the above amount of the component (III). That is, considering that the component (III) may contain a component (III) other than the component (IIIA) and the component (IIIB), the maximum total amount of the component (IIIA) and the component (IIIB) is 20 parts by mass based on 100 parts by mass of the component (I). In the present invention, the component (III) preferably consists of the component (IIIA) and the component (IIIB). In this case, the total amount of the component (IIIA) and the component (IIIB) must be 4.0 to 20 parts by mass based on 100 parts by mass of the component (I). The component (IIIA) and the component (IIIB) must satisfy the following mixing ratio.

That is, when the amount of the above component (IIIA) is 100 parts by mass, the amount of the component (IIIB) must be 10 to 500 parts by mass. When this range is satisfied, the adhesion of a polyamide resin sheet, especially an alicyclic polyamide resin sheet, a polarizing sheet and a polarizing sheet containing a dichroic dye can be enhanced. When the amount of the component (IIIB) is outside the above mixing ratio, high adhesive strength is not obtained disadvantageously. To further enhance adhesion, particularly to bond alicyclic polyamide sheets more firmly and obtain high durability, when the amount of the component (IIIA) is 100 parts bymass, the amount of the component (IIIB) is preferably 50 to 400 parts by mass, more preferably 100 to 300 parts by mass, much more preferably more than 150 to 250 parts by mass, particularly preferably 160 to 250 parts by mass. Within the above mixing ratio, a polarizing sheet and a polarizing sheet containing a dichroic dye can be bonded to a polymer sheet more firmly.

<Other Compounding Components in Adhesive Composition>

<(II) Coloring Matter>

The adhesive composition of the present invention may comprise components other than the above components (I) and (III). To enhance the function of the obtained laminate, (II) a coloring matter may be contained. By containing the coloring matter, the obtained laminate may be used as an optical article such as sunglass.

As the coloring matter (II), organic and inorganic coloring matters which are mixed with an ordinary polymer may be used without restriction. Examples of the coloring matter include known fluorescent dyes, dyes, pigments and photochromic compounds. When the coloring matter is used, the amount thereof may be suitably determined according to use purpose. In general, the amount of the coloring matter is preferably 0.1 to 20.0 parts by mass, more preferably 0.5 to 10.0 parts by mass, much more preferably 1.0 to 7.0 parts by mass based on 100 parts by mass of the total of the component (I) and the component (III).

To make the obtained laminate more useful, the coloring matter (II) preferably contains a photochromic compound. When the coloring matter contains a photochromic compound, sunglasses which color upon exposure to sunlight and become transparent indoors can be produced. The adhesive layer made of the adhesive composition of the present invention can have a suitable space in which the photochromic compound moves and therefore can exhibit excellent photochromic properties as well as adhesion.

As the above photochromic compound, known photochromic compounds such as chromene compounds, fulgimide compounds, spirooxazine compounds and spiropyran compounds may be used. They may be used alone or in combination of two or more.

As the above fulgimide compounds, spirooxazine compounds, spiropyran compounds and chromene compounds, compounds described in JP-A 2-28154, JP-A 62-288830, WO94/22850 and WO96/14596 are used.

Out of these photochromic compounds, at least one chromene compound having an indeno(2,1-f)naphtho(1,2-b)pyran skeleton is preferably used from the viewpoint of photochromic properties such as color optical density, initial coloration, durability and fading speed. Out of these chromene compounds, a compound having a molecular weight of not lower than 540 is more preferred as it is particularly excellent in color optical density and fading speed.

Examples of the photochromic compound which can be particularly preferably used in the present invention are given below.

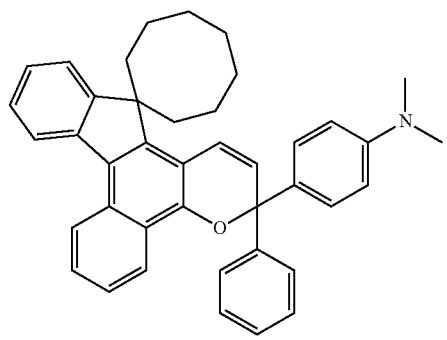

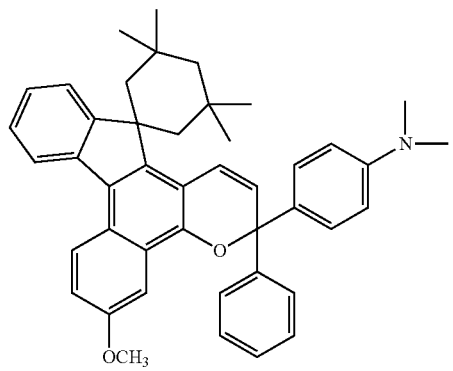

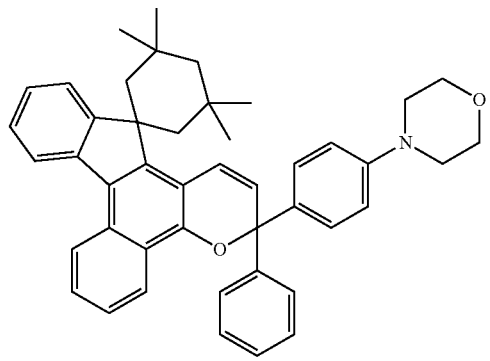

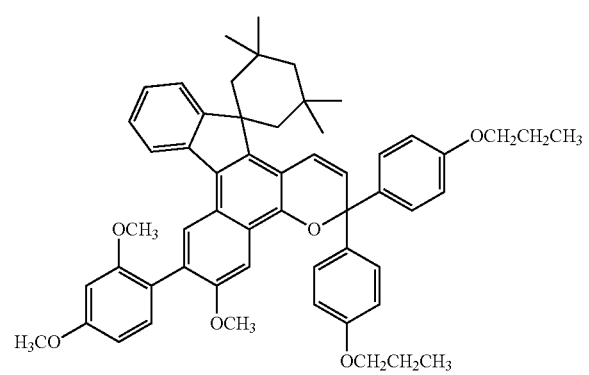

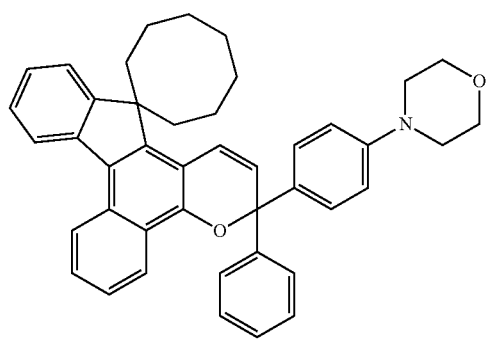

-continued

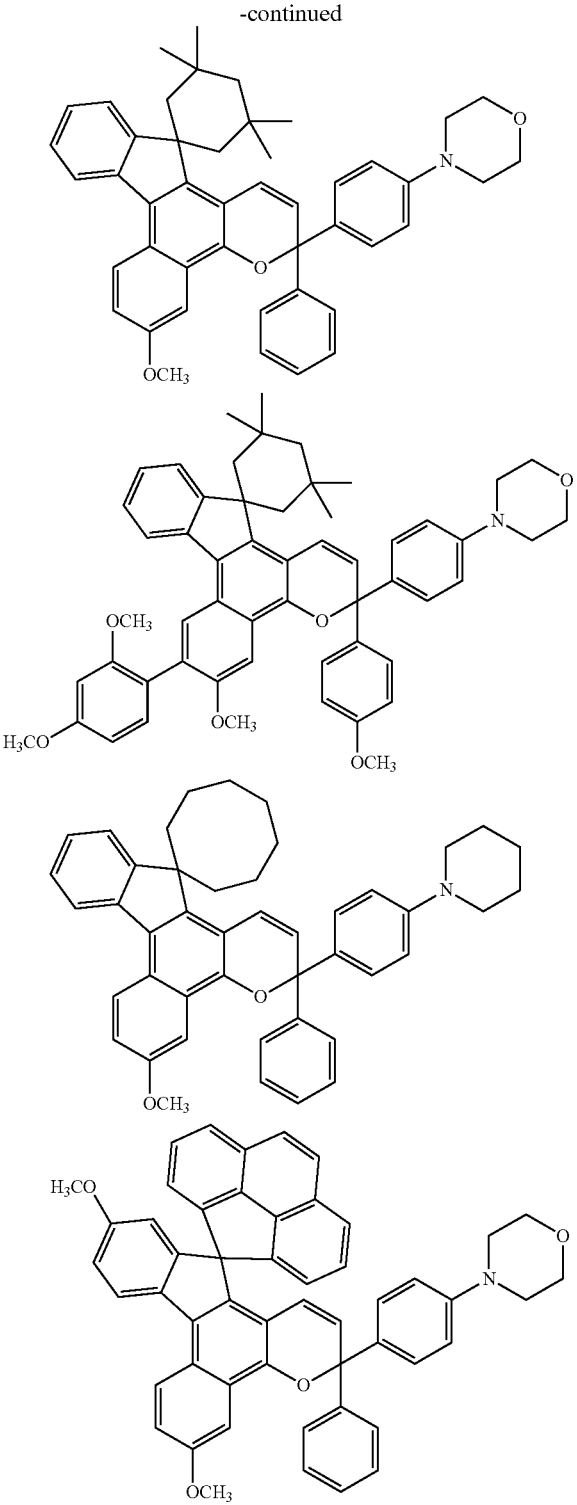

In the present invention, the amount of the photochromic compound is preferably 0.1 to 20.0 parts by mass based on 100 parts by mass of the total of the component (I) and the component (III) from the viewpoint of photochromic properties. When the amount is too small, satisfactory color optical density and durability may not be obtained. When the amount is too large, depending on the type of the photochromic compound, the photochromic compound hardly dissolves in the photochromic composition, whereby the homogeneity of the composition tends to degrade and the adhesive strength (bonding strength) tends to lower. To retain adhesion between polymer sheets completely while photochromic properties such as color optical density and durability are maintained, the amount of the photochromic compound is more preferably 0.5 to 10.0 parts by mass, much more preferably 1.0 to 7.0 parts by mass based on 100 parts by mass of the total of the component (I) and the component (III).

In the present invention, a coloring matter having an absorption peak at 550 to 600 nm may also be used as the coloring matter (II). By using this coloring matter having an absorption peak at 550 to 600 nm, the antiglare properties of the obtained laminate can be further improved.

Examples of the coloring matter having an absorption peak at 550 to 600 nm include nitro-based compounds, azo-based compound, anthraquinone-based compounds, threne-based compounds, porphyrin-based compounds and rare earth metal compounds. Out of these compounds, porphyrin-based compounds and rare earth compounds are preferred from the viewpoints of balance between antiglare properties and visibility. Porphyrin-based compounds are most preferred from the viewpoint of dispersion stability into plastic materials.

The rare earth metal compounds include complexes such as aqua hydroxy(1-phenyl1,3-butanedionato)neodymium, aqua hydroxy(phenacylphenylketonato)neodymium, aqua hydroxy(1-phenyl-2-methyl-1,3-butanedionato)neodymium, aqua hydroxy(1-thiophenyl-1,3-butanedionato) neodymium, aqua hydroxy(1-phenyl1,3-butanedionato)erbium and aqua hydroxy(1-phenyl1,3-butanedionato) holmium.

The porphyrin-based compounds are compounds which may have various substituents on a porphyrin skeleton, for example, compounds disclosed in JP-A 5-194616, JP-A 5-195446, JP-A 2003-105218, JP-A 2008-134618, JP-A 2013-61653, JP-A 2015-180942, WO2012/020570, Japanese Patent No. 5626081, Japanese Patent No. 5619472 and Japanese Patent No. 5778109, all of which may be preferably used. As a particularly preferred porphyrin-based compound, a tetraazaporphyrin compound represented by the following formula (4) is used.

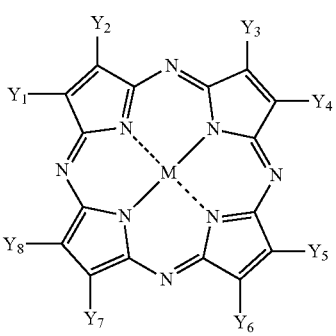

(4)

(In the above formula, $Y_1$, $Y_3$, $Y_5$ and $Y_7$ are each a hydrogen atom, $Y_2$, $Y_4$, $Y_6$ and $Y_8$ are each a linear or branched alkyl group having 1 to 6 carbon atoms, and M is a divalent metal atom or oxide metal atom.)

Examples of the linear or branched alkyl group having 1 to 6 carbon atoms include methyl group, ethyl group, n-propyl group, isopropyl group, n-butyl group, isobutyl group, tert-butyl group, n-pentyl group, isopentyl group, neopentyl group, tert-pentyl group, 1,2-dimethylpropyl group, 1-methylbutyl group, 2-methylbutyl group, n-hexyl group, 2-methylpentyl group, 4-methylpentyl group, 4-methyl-2-pentyl group, 1,2-dimethylbutyl group, 2,3-dimethylbutyl group and 2-ethylbutyl group.

Examples of the divalent metal atom include Cu, Zn, Fe, Co, Ni, Ru, Pd, Pt, Mn, Mg, Ti, Ba, Cd, Hg, Pd and Sn. Examples of the oxide metal atom include VO, MnO and TiO.

The tetraazaporphyrin compound represented by the above formula (4) is actually one isomer or a mixture of two or more different isomers. Even for the description of the structure of the mixture of different isomers, for the convenience' sake, one structural formula represented by the above formula (4) is given in the present invention.

In the present invention, the above tetraazaporphyrin compounds may be used alone or in combination of two or more. Further, one isomer or a mixture of two or more isomers may be used. As desired, each isomer is separated from the mixture, and one compound contained in the isomer may be used. Further, a plurality of isomers in an arbitrary ratio may be used in combination.

From the viewpoint of antiglare properties, out of the above tetraazaporphyrin compounds, a compound having an absorption maximum at 580 to 605 nm is preferably used.

<(II) Components Other than Coloring Matter>
<Other Components>

Additives such as organic solvent, water, surfactant, antioxidant, radical scavenger, ultraviolet stabilizer, ultraviolet absorbent, release agent, coloring inhibitor, antistatic agent, aroma chemical and plasticizer may be further added to the adhesive composition of the present invention to obtain film formability (improvement of productivity of laminate). Known compounds may be used without restriction as the additives. By using these additives, when the adhesive composition comprises the photochromic compound, the durability, color developing speed and fading speed of the photochromic compound are improved.

In consideration of the forming ease of the adhesive layer, the adhesive composition preferably comprises an organic solvent. This organic solvent is preferably removed when the adhesive layer is formed. Examples of the organic solvent include alcohols such as methanol, ethanol, n-propanol, i-propanol, 2-pentanol, 3-pentanol, 3-methyl-2-butabol, 4-methyl-2-pentanol, n-butanol, t-butanol, 2-butanol, t-pentyl alcohol and 2,2,2-trifluoroethanol; polyhydric alcohol derivatives such as ethylene glycol monomethyl ether, ethylene glycol monoisopropyl ether, ethylene glycol monoethyl ether, ethylene glycol mono-n-propyl ether, ethylene glycol mono-n-butyl ether, ethylene glycol mono-t-butyl ether, propylene glycol monomethyl ether, propylene glycol monoethyl ether, propylene glycol-n-butyl ether and ethylene glycol dimethyl ether; diacetone alcohols; ketones such as methyl ethyl ketone, diethyl ketone, n-propyl methyl ketone, methyl isobutyl ketone, diisopropyl ketone and n-butyl methyl ketone; toluene; hexane; heptane; acetates such as ethyl acetate, 2-methoxyethyl acetate and 2-ethoxyethyl acetate; dimethyl formamide (DMF); dimethyl sulfoxide (DMSO); tetrahydrofuran (THF); cyclohexanone; chloroform; and dichloromethane and combinations thereof.

To form smoothness of coating layer or a smooth adhesive layer when the adhesive composition of the present invention is applied to a polymer sheet, the above organic solvent is preferably a combination of an organic solvent having a boiling point lower than 90° C. and an organic solvent having a boiling point not lower than 90° C. By using this combination of organic solvents, it is easy to obtain the above smoothness and remove the organic solvents, thereby making it possible to accelerate the drying speed. The mixing ratio of the organic solvent having a boiling point lower than 90° C. and the organic solvent having a boiling point not lower than 90° C. may be suitably determined according to the other components in use. To obtain an excellent effect, preferably, the amount of the organic solvent having a boiling point lower than 90° C. is 20 to 80 mass % and the amount of the organic solvent having a boiling point not lower than 90° C. is 80 to 20 mass % based on 100 mass % of the total of all the organic solvents.

When the organic solvent is used, from the viewpoint of an effect obtained by using the above organic solvent, the amount of the organic solvent is preferably 5 to 900 parts by mass, particularly preferably 100 to 750 parts by mass, most preferably 150 to 400 parts by mass based on 100 parts by mass of the component (I).

As the surfactant, any one of nonionic, anionic and cationic surfactants may be used. A nonionic surfactant is preferably used from the viewpoint of solubility in the adhesive composition. Preferred examples of the nonionic surfactant which is preferably used include sorbitan fatty acid esters, glycerin fatty acid esters, decaglycerin fatty acid esters, propylene glycol-pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene phytosterol-phytostanol, polyoxyethylene polyoxypropylene alkyl ethers, polyoxyethylene alkylphenyl ethers, polyoxyethylene castor oil-hardened castor oil, polyoxyethylene lanoline·lanoline alcohol·beeswax derivatives, polyoxyethylene alkylamine fatty acid amides, polyoxyethylene alkylphenyl formaldehyde condensates, homogeneous polyoxyethylene alkyl ether and silicone-based and fluorine-based surfactants.

The surfactants may be used alone or in combination of two or more. The amount of the surfactant is preferably 0.001 to 5 parts by mass based on 100 pars by mass of the component (I).

As the antioxidant, radical scavenger, ultraviolet stabilizer and ultraviolet absorbent, hindered amine optical stabilizers, hindered phenol antioxidants, phenol-based radical scavengers, sulfur-based antioxidants, phosphor-based antioxidants, triazine-based compounds, benzotriazole-based compounds and benzophenone-based compounds may be preferably used, respectively. These antioxidants, radical scavengers, ultraviolet stabilizer and ultraviolet absorbents may be used in combination of two or more. When these additives are used, the surfactant may be used in combination with the antioxidant, radical scavenger, ultraviolet stabilizer or ultraviolet absorbent.

The amount of each of the antioxidant, radical scavenger, ultraviolet stabilizer and ultraviolet absorbent is preferably 0.001 to 20 parts by mass based on 100 parts by mass of the component (I). When these additives are used too much, adhesion to the polymer sheet deteriorates. Therefore, the amount is preferably 0.001 to 7 parts by mass, more preferably 0.001 to 3 parts by mass, most preferably 0.001 to 1 part by mass.

<Production Method of Adhesive Composition>

The adhesive composition of the present invention can be produced by mixing together the above component (I) and the component (III), and optionally the component (II) and other components. The order of mixing these components is not particularly limited.

For example, when no organic solvent is used, the components are melt kneaded together to obtain the adhesive composition which may be then pelletized or formed a sheet directly. When the organic solvent is used, the adhesive composition can be obtained by dissolving the components in the organic solvent.

(Adhesive Layer Made of Adhesive Composition and Method of Forming the Adhesive Layer>

In the present invention, a laminate having polymer sheets bonded together through an adhesive layer can be produced by the following method. For example, the adhesive composition is kneaded to form a uniform adhesive sheet which is then arranged between polymer sheets, and the polymer sheets are pressure contacted to each other, thereby making it possible to produce a laminate having the polymer sheets bonded together through the adhesive layer. When an adhesive composition comprising an organic solvent is used, the adhesive composition is applied to a polymer sheet to form a coating layer, the organic solvent is removed from the coating layer to obtain an adhesive layer, and another polymer sheet is arranged on the adhesive layer and then pressure contacted to the adhesive layer to obtain a laminate.

The method of manufacturing the laminate is not particularly limited but the following method is preferably employed to obtain a laminate having excellent smoothness.

Stated more specifically, the adhesive composition comprising an organic solvent is first applied to a smooth substrate to form a coating layer.

Then, the organic solvent is removed from the coating layer to prepare an adhesive sheet containing at least the component (I) and the component (III). At this point, drying for the removal of the organic solvent is preferably carried out at a temperature from room temperature (23° C.) to 100° C. and a humidity of 10 to 100% RH. It is considered that by drying under these conditions, the hydrolysis reaction of the component (III) is promoted to obtain very high adhesive strength. By drying under the above humidity (presence of moisture), an adhesive sheet having excellent performance and an adhesive layer composed of the adhesive sheet can be obtained without mixing water with the adhesive composition.

Further, a laminate having the adhesive layer is preferably manufactured by interposing the adhesive sheet between polymer sheets to be bonded together and bonding the polymer sheets together in the presence of moisture contained in the atmosphere. At this point, the adhesive sheet becomes the adhesive layer.

When this preferred method is used, for example, possibility that iodine oozes out from the polarizing sheet due to the organic solvent at the time of bonding the polarizing sheet can be suppressed, thereby making it possible to improve adhesive strength. Since the adhesive sheet from which the organic solvent has been removed is used, it is considered that there is no possibility that additives contained in the polyamide resin sheet are extracted, whereby polyamide resin sheets can be firmly bonded together. In the case of a polarizing sheet containing a dichroic dye, by employing the preferred method, polymer sheets can be bonded together more firmly.

In the present invention, to stabilize the adhesion of the obtained laminate more firmly, the laminate is preferably treated by the following procedure (an adhesive layer in which the component (III) has been completely reacted is preferably formed by the following procedure).

Stated more specifically, a laminated sheet obtained right after the polymer sheets are bonded together by the adhesive sheet is preferably left to stand at 20 to 60° C. for 4 hours or more to be degassed. Although the upper limit of the standing time may be determined by observing the state of the laminated sheet, 50 hours suffices. Standing at normal pressure is possible and standing under vacuum is also possible (this step may be referred to as "degassing step" hereinafter).

Then, the laminated sheet which has been left to stand is preferably left as it is at a temperature of 60 to 130° C. for 30 minutes to 3 hours (may be referred to as "heating step" hereinafter). It is considered that, by carrying this heat treatment, the adhesive sheet is softened and molten at the interface between the adhesive sheet and the polymer sheets, thereby improving adhesion. In addition, it is considered that some of the isocyanate groups of the component (III) are used in the reaction. As a result, it is considered that the isocyanate groups are bonded to the urethane bond or urea bond of the component (I) to promote the formation of an allophanate bond or burette bond. The laminated sheet obtained by this heat treatment becomes very stable.

Then, the laminated sheet treated in the heating step is preferably humidified at a temperature from room temperature (23° C.) to 100° C. and a humidity of 30 to 100% RH (this step may be referred to as "humidifying step" hereinafter). By carrying out this humidification, a crosslinked structure between the components (I) is completed by the component (III), isocyanate groups derived from the component (III) existent in the laminated sheet can be completely eliminated, and adhesion can be made more stable.

Further, surplus moisture existent in the laminated sheet is preferably removed by leaving the laminated sheet after the humidifying step under normal pressure or under vacuum at a temperature of 40 to 130° C. (this step may be referred to as "moisture removing step" hereinafter).

As described above, in the present invention, to manufacture the laminate, after the laminated sheet is produced by pressure bonding polymer sheets together through the adhesive sheet, post-processing is preferably carried out in the order of 1) degassing step, 2) heating step, 3) humidifying step and 4) moisture removing step to change the adhesive sheet to a perfect adhesive layer.

The heat resistance of the adhesive layer made of a reaction product of the component (I) and the component (III) is preferably 120 to 190° C., particularly preferably 150 to 190° C. from the viewpoints of: (i) the physical properties of the laminate obtained by bonding together the polymer sheets through the adhesive layer, (ii) processing stability when an optical article is manufactured by bending or injection molding the obtained laminate, (iii) the adhesion of the obtained laminate, and (iv) processability when a hard coat solution is applied and cured to form a hard coat layer on the surface of the laminate or the optical article. The heat resistance as used in the present invention means a softening point measured under the following conditions by using a thermomechanical analyzer (TMA120C of Seiko Instruments Inc.).

[measurement conditions] temperature elevation rate: 10° C./min, measurement temperature range: 30 to 200° C., probe: needle probe having an end diameter of 0.5 mm In the present invention, to make the obtained laminate exhibit excellent characteristic properties, the above adhesive composition preferably comprises the component (I) having a heat resistance of 80° C. or higher and lower than 120° C. and the component (III). The heat resistance of the adhesive layer made of the adhesive composition is more preferably 120 to 190° C., particularly preferably 150 to 190° C.

The component (I) having a heat resistance of 80° C. or higher and lower than 120° C. is considered to have flexibility and high movability. When a photochromic compound is mixed with this component (I) as a base material while having a certain level of heat resistance, excellent photochromic properties can be developed. Further, an adhesive composition comprising the soft component (I) and the above component (III) is considered to become one of the causes of improving adhesion to a polyamide resin sheet and a polarizing sheet and enhancing adhesion between polymer sheets. In addition, as described above, the effect of improving heat resistance and adhesion by adding the component (III) is obtained after the laminate is manufactured (the adhesive layer is completely formed), thereby producing a laminate having excellent characteristic properties.

The thickness of the adhesive layer is suitably determined according to use purpose. When the adhesive layer contains a photochromic compound, the thickness thereof is preferably 1 to 100 μm in consideration of characteristic properties thereof.

<Polymer Sheet>

In the laminate obtained by bonding polymer sheets together through the adhesive layer, each of the polymer sheets is not particularly limited. Examples of the polymer sheet include polycarbonate resin sheets, polyester resin sheets, polyamide resin sheets, cellulose resin sheets, acrylic resin sheets, urethane-based resin sheets, polyolefin resin sheets and polarizing sheets. The thickness of each of these sheets should be suitably determined according to the application purpose of the laminate. Although the optimum thickness differs according to the purpose of the laminate, in general, a polymer sheet having a thickness of 20 to 1,500 μm may be used.

The adhesive composition of the present invention exhibits an excellent effect when a polyamide resin sheets and a polarizing sheet which have been difficult to be bonded are bonded. A description is subsequently given of the alicyclic polyamide sheet and the polarizing sheet which are used in the present invention.

<Sheet Made of Alicyclic Polyamide Resin (Alicyclic Polyamide Sheet)>

An example of the polymer sheet used in the present invention is a sheet made of an alicyclic polyamide resin (alicyclic polyamide sheet) from the viewpoints of mechanical strength and solvent resistance (chemical resistance). The alicyclic polyamide resin may be a copolyamide which contains an aliphatic polyamide resin or aromatic polyamide resin.

An example of the alicyclic polyamide resin is a homo- or co-polyamide containing at least one selected from alicyclic diamines and alicyclic dicarboxylic acids as a constituent component. The alicyclic diamines include diaminocycloalkanes (5 to 10 carbon atoms) such as diaminocyclohexane; and bisaminocycloalkyl (5 to 10 carbon atoms) alkanes (1 to 6 carbon atoms) such as bis(4-aminocyclohexyl)methane, bis(4-amino-3-methylcyclhexyl)methane and 2,2-bis(4'-aminocyclohexyl)propane. The alicyclic diamines may have a substituent such as an alkyl group (alkyl group having 1 to 6 carbon atoms, preferably 1 to 4 carbon atoms, more preferably 1 to 2 carbon atoms). The alicyclic dicarboxylic acids include cycloalkane dicarboxylic acids having 5 to 10 carbon atoms such as cyclohexane-1,4-dicarboxylic acid and cyclohexane-1,3-dicarboxylic acid.

The alicyclic polyamide resin may be a resin containing an aliphatic diamine (such as alkylenediamine having 4 to 14 carbon atoms such as tetramethylenediamine, hexamethylenediamine or dodecanediamine) and/or aliphatic dicarboxylic acid (such as alkanedicarboxylic acid having 4 to 18 carbon atoms such as adipic acid, sebacic acid or dodecanedioic acid) as the above diamine component and the above dicarboxylic acid component in combination with the alicyclic diamine and/or the alicyclic dicarboxylic acid.

Preferred examples of the alicyclic polyamide resin include resins (homo- or co-polyamides) containing an alicyclic diamine [such as bis(aminocycloalkyl (5 to 10 carbon atoms) alkane (1 to 6 carbon atoms), preferably bisaminocycloalkyl (6 to 8 carbon atoms) alkane (1 to 6 carbon atoms), more preferably bisaminocyclohexylalkane (1 to 3 carbon atoms)) and an aliphatic dicarboxylic acid (such as alkanedicarboxylic acid having 4 to 18 carbon atoms, preferably 6 to 16 carbon atoms, more preferably 8 to 14 carbon atoms) as constituent components. A typical example of the alicyclic polyamide resin is an alicyclic polyamide represented by the following formula (5).

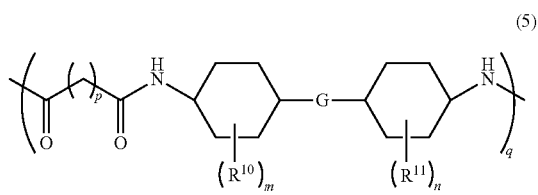

(5)

(In the above formula, G is a direct bond, alkylene group or alkenylene group, $R^{10}$ and $R^{11}$ are the same or different alkyl groups, "m" and "n" are each 0 or an integer of 1 to 4, and "p" and "q" are each an integer of 1 or more.) In the formula (5), examples of the alkylene group (or alkylidene group) represented by G include alkylene groups (or alkylidene groups) having 1 to 6 carbon atoms such as methylene, ethylene, ethylidene, propylene, propane-1,3-diyl, 2-propylidene and butylene, preferably alkylene groups (or alkylidene groups) having 1 to 4 carbon atoms, more preferably alkylene groups (or alkylidene groups) having 1 to 3 carbon atoms. Examples of the alkenylene group represented by G include alkenylene groups having 2 to 6 carbon atoms such as vinylene and propenylene, preferably alkenylene groups having 2 to 4 carbon atoms.

Examples of the alkyl group represented by $R^{10}$ and $R^{11}$ in the above formula (5) include alkyl groups having 1 to 6 carbon atoms such as methyl group, ethyl group, propyl group, isopropyl group, butyl group and isobutyl group, preferably alkyl groups having 1 to 4 carbon atoms, more preferably alkyl groups having 1 to 2 carbon atoms (methyl group, ethyl group).

"m" and "n" in the above formula (5) are each selected from 0 and an integer of 1 to 4, generally 0 or an integer of 1 to 3, preferably 0 or an integer of 1 to 2, more preferably 0 or 1. The substitution positions of the substituents $R^{10}$ and $R^{11}$ can be selected from the 2-position, 3-position, 5-position and 6-position, preferably the 2-position and 6-position with respect to the amide group.

In the above formula (5), "p" is preferably 4 or more, more preferably 6 to 20, most preferably 8 to 15. In the above formula (5), "q" (polymerization degree) is preferably 5 or more, more preferably 10 to 800, most preferably 50 to 500.

As the above alicyclic polyamide resin, commercially available products may be used. Examples thereof include TROGAMID (registered trademark) of Daicel Evonik Ltd. and Grilamid (registered trademark) and Grilamid TR (registered trademark) of EMS-GRIVORY. The alicyclic polyamide resins may be used alone or in combination of two or more.

The number average molecular weight of the alicyclic polyamide resin is, for example, 6,000 to 300,000, preferably 10,000 to 200,000, more preferably about 15,000 to 100,000.

The alicyclic polyamide resin may have a heat melting temperature (or melting point) which is, for example, 100 to 300° C., preferably 110 to 280° C., more preferably 130 to 260° C. The heat melting temperature of an alicyclic polyamide resin having crystallinity (particularly microcrystallinity) is, for example, 150 to 300° C., preferably 180 to 280° C., more preferably about 210 to 260° C.

The alicyclic polyamide resin has a Vicat softening point of 100 to 200° C., preferably 110 to 170° C., more preferably about 130 to 150° C.

The alicyclic polyamide resin has a glass transition point of 100 to 200° C., preferably 110 to 170° C., more preferably about 125 to 150° C.

The alicyclic polyamide resin has a linear expansion coefficient of 0.1 to 1.5, preferably 0.3 to 1.0, more preferably about 0.5 to 0.9.

The alicyclic polyamide sheet used in the present invention may be subjected to hard coating according to purpose. Any known optically curable or thermally curable hard coat can be used without restriction. In general, a thermally curable hard coat is excellent in productivity and cured at about 90 to 130° C. for 1 to 3 hours to be used. Since the alicyclic polyamide sheet has the above Vicat softening point and glass transition point even under the above conditions, it can be used without being thermally deformed at the time of laminating a hard coat.

The alicyclic polyamide sheet used in the present invention contains the above alicyclic polyamide resin as the main component. It may contain another resin as long as the effect of the present invention is obtained. Examples of the other resin include known aliphatic polyamide resins and aromatic polyamide resins.

The alicyclic polyamide sheet has a larger Abbe number than that of a polycarbonate sheet. Therefore, as compared with a case in which polycarbonate (Abbe number of 34) is used, the production of an uneven color such as rainbow color in the obtained laminate can be suppressed efficiently by using the alicyclic polyamide sheet. Therefore, the Abbe number of the alicyclic polyamide sheet used in the present invention is preferably 40 to 65, more preferably 50 to 60.

When the alicyclic polyamide sheet is used in combination with a polarizing sheet which will be described hereinafter to produce the laminate, since the aliphatic polyamide resin has a larger Abbe number than that of a polycarbonate resin as described above, an uneven color such as rainbow color is not generally produced without increasing the retardation value (or the production of a rainbow uneven color can be suppressed at a high level or prevented). However, when a laminate formed by combining the aliphatic polyamide sheet and the polarizing sheet is bent (formed into a curved shape), the polarization degree may lower. Therefore, as the alicyclic polyamide sheet used in the present invention, an alicyclic polyamide sheet which has been monoaxially stretched to obtain a retardation value of not less than 100 nm is preferably used. By using this alicyclic polyamide sheet having the above retardation value, the reduction of the polarization degree at the time of bending a laminate obtained by combining the polarizing sheet can be suppressed. In the present invention, when the alicyclic polyamide sheet and the polarizing sheet are combined, the retardation value of the alicyclic polyamide sheet is preferably 100 to 10,000 nm, more preferably 350 to 6,000 nm, much more preferably 500 to 5,000 nm.

When the alicyclic polyamide sheet which has been monoaxially stretched is used, it should be formed as at least one of the both surfaces of the obtained laminate. The above monoaxially stretched alicyclic polyamide sheet or an unstretched alicyclic polyamide sheet may be used as the other surface (may be a rear surface) of the laminate.

In the present invention, the alicyclic polyamide sheet may contain various additives such as stabilizer (heat stabilizer, ultraviolet absorbent, antioxidant, etc.), plasticizer, lubricant, filler, colorant, flame retardant and antistatic agent. When a photochromic compound is used in the adhesive composition, an alicyclic polyamide sheet which does not contain an additive absorbing ultraviolet light such as ultraviolet absorbent is preferably used on the front side (outer surface to be exposed to sunlight when the laminate is used in sunglasses) not to prevent the color development of the photochromic compound.

In the present invention, the preferred thickness of the alicyclic polyamide sheet is preferably 30 to 1,000 μm, more preferably 50 to 600 μm, much more preferably 100 to 300 μm. The alicyclic polyamide sheets which differ in thickness may be used in combination.

In the present invention, as the alicyclic polyamide sheet, commercially available products may be used. For example, TROGAMID CX film (registered trademark) of Daicel Evonik Ltd. may be used.

In the present invention, the surface of the alicyclic polyamide sheet may be subjected to various surface treatments (such as corona discharge treatment, plasma treatment, anchor coating) to improve adhesion.

<Polarizing Sheet>

When a polarizing sheet is used in the present invention, commercially available polarizing sheets may be used without restriction. The thickness of the polarizing sheet is preferably 20 to 100 μm. The polarizing sheet is produced by stretching a polyvinyl alcohol dyed with a dichroic material such as iodine or dichroic dye. In the prior art, it was difficult to bond the polarizing sheet with an adhesive due to the influence of a dichroic material such as iodine or dichroic dye contained in the polarizing sheet. The above polarizing sheet can be bonded firmly with the adhesive composition of the present invention.

<Polarizing Sheet Containing a Dichroic Dye>

The adhesive composition of the present invention can bond a polarizing sheet containing a dichroic dye to a polymer sheet firmly.

Commercially available dichroic dyes may be used without restriction as the dichroic dye contained in the polarizing sheet. For example, azo-based and anthraquinone-based dyes are used. Illustrative examples of the dichroic dye include CHLORANTINE FAST RED (C.I. 28160), CONGO RED (C.I. 22120), BRILLIANT BLUE B (C.I. 24410), BENZOPURPURIN (C.I. 23500), CHLORAZOL BLACK BH (C.I. 22590), DIRECT BLUE 2B (C.I. 22610), DIAMINE GREEN (C.I. 30295), CHRYSOPHENINE (C.I. 24895), SIRIUS YELLOW (C.I. 29000), DIRECT FAST RED (C.I. 23630), ACID BLACK (C.I. 20470), DIECT SKY BLUE (C.I. 24400), SOLOPHENYL BLUE 4GL (C.I. 34200), DIRECT COPPER BLUE 2B (C.I. 24185) andNIPPONBRILLIANT VIOLET BK conc (C.I. 27885). Two or more coloring matters may be selected from these dichroic dyes according to purpose and used. The figures within the parentheses show color index No. described in "New Edition Dye Handbook" edited by the Society of Synthetic Organic Chemistry, Japan (MARUZEN, 1970).

Although the polarizing sheet containing a dichroic dye is not particularly limited, even a polarizing sheet having a luminous transmittance of 10 to 60% and a polarizing degree of 70.0 to 99.9 can be bonded firmly by using the adhesive composition of the present invention. When the polarizing sheet containing a dichroic dye is used, the polymer sheet to be bonded to the polarizing sheet is not particularly limited as a matter of course, and even a polyamide resin sheet, preferably an alicyclic polyamide sheet or polycarbonate sheet can be firmly bonded.

<Other Modes and Treating Method of Polarizing Sheet>

The polarizing sheet may have a cellulose triacetate film on both sides to enhance its function and adhesion. The cellulose triacetate film has a thickness of preferably 20 to 200 μm, more preferably 20 to 100 μm.

The polarizing sheet which has been heated at 40 to 100° C. for about 5 seconds to 30 minutes may be used before the production of the laminate of the present invention in order to adjust the amount of moisture contained in the polarizing sheet and achieve the dimensional stability of the polarizing sheet.

<Constitution of Laminate and Preferred Laminate Production Method>

Figure 2:
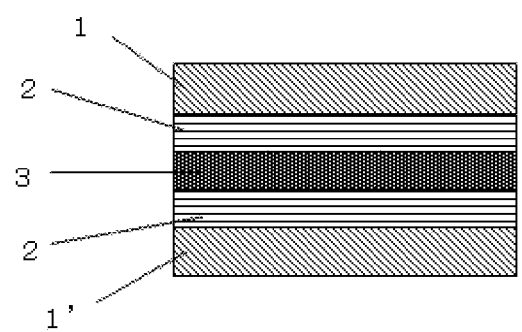
FIG. 2 shows another preferred example of the laminate obtained by using the adhesive composition of the present invention.
Figure 3:
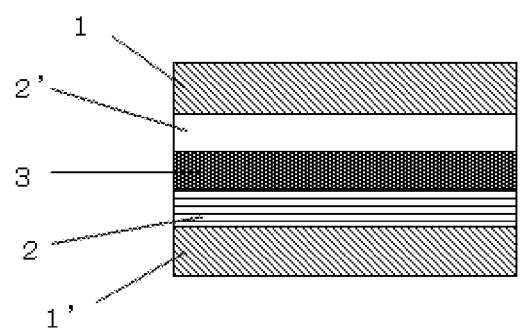
FIG. 3 shows a still another preferred example of the laminate obtained by using the adhesive composition of the present invention.

FIGS. 1 to 3 show the layered structures of preferred laminates according to the present invention.

FIG. 1 shows an example in which an adhesive composition comprising a coloring matter, for example, a photochromic compound is used. The laminate consists of an alicyclic polyamide sheet 1, an adhesive layer 2' containing a coloring matter and an alicyclic polyamide sheet 1'.

The laminate shown in FIG. 1 is preferably produced by the following method. The adhesive composition comprising an organic solvent is first applied to a smooth substrate. Then, the organic solvent is removed to produce an adhesive sheet having smooth surfaces. Subsequently, while the adhesive sheet is arranged between a pair of opposed alicyclic polyamide sheets, the both sheets are preferably pressure contacted to each other by means of a lamination roll from the outer surfaces of the alicyclic polyamide sheets. Thereby, the adhesive sheet becomes an adhesive layer, thereby making it possible to produce the laminate having a layered structure shown in FIG. 1. In this case, an adhesive layer 2 containing no coloring matter may be formed between the adhesive layer 2' containing a coloring matter and the aliphatic polyamide sheets 1 and 1'.

FIG. 2 shows an example of a layered structure in which a polarizing sheet 3 is used. The laminate consists of the alicyclicpolyamide sheet 1, an adhesive layer 2, a polarizing sheet 3, an adhesive layer 2 and the alicyclic polyamide sheet 1'.

The laminate shown in FIG. 2 is preferably produced by the following method. Two adhesive sheets containing no coloring matter are prepared by the same method as above. The adhesive sheets are formed on both sides of the polarizing sheet, respectively. Then, the alicyclic polyamide sheets are preferably arranged on both sides of the polarizing sheet having the adhesive sheets on both surfaces and pressure contacted to each other by means of a lamination roll from the outer surfaces of the alicyclic polyamide sheets, respectively. Thereby, the adhesive sheets become adhesive layers, thereby making it possible to produce a laminate having a layered structure shown in FIG. 2.

FIG. 3 shows an example of a laminate having a layered structure when an adhesive layer 2' containing a coloring matter, for example, a photochromic compound and a polarizing sheet 3 are combined. The laminate consists of the alicyclic polyamide sheet 1, the adhesive layer 2' containing a coloring matter, the polarizing sheet 3, the adhesive layer 2 and the alicyclic polyamide sheet 1'.

The laminate shown in FIG. 3 is preferably produced by the following method. That is, in the method of producing the laminate shown in FIG. 2, the same production method as that for the laminate shown in FIG. 2 is employed to ensure that the coloring matter is contained in the adhesive sheet formed on one side of the polarizing sheet, thereby making it possible to obtain the laminate shown in FIG. 3.

In the present invention, an ordinary plastic resin film, for example, a polyolefin-based film such as polyethylene or polypropylene film may be attached as a protection film to the outermost layers (surfaces of the alicyclic polyamide sheets 1 and 1') of the laminate to prevent scratching, staining or the adhesion of foreign matter. By attaching this protection film to the outermost layers, surface protection becomes possible when the obtained laminate is thermally bent or punched, stored and carried. This protection film is peeled off when the laminate is used as the final product such as a spectacle lens. This protection film may be optionally attached to the surfaces of the alicyclic polyamide sheets which are the outermost layers of the laminate before the formation of the adhesive sheet or after the production of the laminate.

Having explained examples in which the alicyclic polyamide sheets and the polarizing sheet are used, the adhesive composition of the present invention is used not only when the alicyclic polyamide sheets and the polarizing sheet are bonded together. As a matter of course, the adhesive composition of the present invention may also be used to bond the polarizing sheet containing a dichroic dye to another polymer sheet, for example, a carbonate sheet.

<Optical Article Including Laminate>

In the present invention, the laminate may be used as an optical article by injection molding the same material as the polymer sheet onto at least one of the polymer sheets to be integrated with each other. When the polymer sheet is an alicyclic polyamide resin sheet, an alicyclic polyamide resin should be laminated on the alicyclic polyamide resin sheet by injection molding.

As means of integration, the above laminate is placed in a mold and a material constituting an optical article is injection molded. The laminate may be bent to be formed into a lens-like spherical shape before injection molding. As means of bending the laminate, thermal pressing, pressure processing or vacuum suction processing is employed. The temperature for bending is suitably determined according to the type of an optical sheet or film composed of a polymer sheet (preferably an alicyclic polyamide sheet or polycarbonate sheet, particularly preferably an alicyclic polyamide sheet) used in the above laminate but preferably 100 to 150° C.

The obtained optical article may be subjected to post-processing such as hard coating by a known method according to use purpose.

EXAMPLES

The following examples are provided for the purpose of further illustrating the present invention but are in no way to be taken as limiting. A description is subsequently given of the component (III) in use.

(III) Polyisocyanate compound (IIIA) polyisocyanate compound having an isocyanate group bonded to secondary carbon (IIIA1) isomer mixture of 4,4'-methylenebis(cyclohexylisocyanate)

(IIIA2) trimer of isophorone diisocyanate (Tolonate IDT70B of Perstorp, mixed with 30% butyl acetate, molecular weight of 666)

(IIIB) polyisocyanate compound having 4 to 40 carbon atoms in the molecule other than (IIIA)

(IIIB1) isocyanurate material of hexamethylene diisocyanate (DURANATE TPA-100 of Asahi Kasei Corporation)

(IIIB2) burette material of hexamethylene diisocyanate (DURANATE 24A-100 of Asahi Kasei Corporation)

(IIIB3) hexamethylene diisocyanate

Example 1

(1) Production of Polyurethane Urea Resin (U1)/Component (I)

(Production of Urethane Prepolymer)

A cooling tube, a thermometer and a nitrogen gas introduction tube were connected to a reactor vessel having an inner diameter of 260 mm, a height of 280 mm and a loading capacity of 10 L and equipped with a Maxblend blade having a diameter of 135 mm and a baffle plate. The Maxblend blade was stirred at 100 rpm.

1,770 g of a polycarbonate diol having a number average molecular weight of 800, 700 g of isophorone diisocyanate and 500 g of toluene were fed to this reactor vessel to carry out a reaction in a nitrogen atmosphere at 100° C. for 7 hours so as to synthesize a urethane prepolymer having an isocyanate group at the end. The end of the reaction was confirmed by the back-titration method of the isocyanate group.

(Production of Polyurethane Urea Resin (U1); Component (I))

After the end of the urethane polymer reaction, the reaction solution was cooled to around 0° C., dissolved in 1,430 g of isopropyl alcohol and 2,670 g of diethyl ketone and kept at 0° C. Then, a mixed solution of 171 g of bis-(4-aminocyclohexyl)methane which is a chain extender and 145 g of diethyl ketone was added dropwise in 30 minutes to carry out a reaction at 0° C. for 1 hour. Thereafter, 42 g of 1,2,2,6,6-pentamethyl-4-aminopiperidine was added dropwise to carry out a reaction at 0° C. for 1 hour so as to obtain a diethyl ketone solution of a polyurethane urea resin (U1). The obtained polyurethane urea resin (U1) had a number average molecular weight of 19,000, a weight average molecular weight of 41,000, a polydispersity of 2.16, a softening point (softening start temperature; about 80° C.) of 105° C. and a kinetic viscosity of 15,000 cSt. The solution of the polyurethane urea resin (U1) had a solid content concentration (concentration of the polyurethane urea resin (U1)) of 36 mass %.

Since the above U1 contained 2,683 g of the urethane urea resin, 500 g of toluene (boiling point of 110.6° C.), 1,430 g of isopropyl alcohol (boiling point of 82.6° C.) and 2,815 g of diethyl ketone (boiling point of 101° C.), the total amount of the organic solvents was 177 parts by mass based on 100 parts by mass of U1, the content of the organic solvent having a boiling point lower than 90° C. was 30 mass %, and the content of the organic solvents having a boiling point of 90° C. or higher was 70 mass %.

The viscosity of the reaction solution at the time of starting the addition of bis-(4-aminocyclohexyl)methane which is a polyamine compound was 0.06 kg/m-s, the density was 950 kg/m$^3$, the number of revolutions of the Maxblend blade was 100 rpm, the Reynolds number (Re) was 456, the mixing time number (n·θ$_M$) was 14 from the n·θ$_M$-Re curve of the Maxblend blade, and therefore, the complete mixing time (θ$_M$) was 8 seconds.

<Evaluation Method>

The number average molecular weight, weight average molecular weight, polydispersity, softening point and kinetic viscosity of the above urethane urea resin (U1) were measured by the following methods.

(Number Average Molecular Weight, Weight Average Molecular Weight, Polydispersity)

The number average molecular weight, weight average molecular weight and polydispersity were analyzed by methods described in this text.

That is, these values were obtained by measuring a 1.0% dimethylformamide (DMF) solution as a polyurethane urea resin (U1) sample solution in terms of polyethylene oxide by gel permeation chromatography (GPC) using the two Shodex KD-806M columns (manufactured by Showa Denko K.K.) connected in series, a LiBr (10 mmol/L)/DMF solution as an eluant having a flow rate of 1 ml/min and an RI detector and calculated by using the Empower Personal GPC Option GPC analyzing software of Nippon Waters Corporation. The polydispersity is a value calculated from weight average molecular weight/number average molecular weight which are obtained by the above methods.

(Heat Resistance; Softening Point)

The polyurethane urea resin solution (U1) was poured into a stainless vessel and dried at 40° C. for 10 hours, at 60° C. for 10 hours and at 60° C. for 12 hours in a vacuum drier to produce a test sample having a thickness of 1 mm. The softening point of the obtained test sample was measured at a temperature elevation rate of 10° C./min and a measurement temperature range of 30 to 200° C. by using a thermomechanical analyzer (TMA120C of Seiko Instruments Inc.) and a needle probe having an end diameter of 0.5 mm.

(Kinetic Viscosity)

About 10 g of the polyurethane urea resin (U1) solution was put into a Canon Fenske viscometer (#600) (manufactured by Sibata Scientific Technology Ltd.) which was then immersed in a thermostatic oven whose temperature was controlled to 25° C.±0.1° C. for 15 minutes to measure the kinetic viscosity of U1.

(2) Preparation of Adhesive Composition 1

1,000 g of a polyurethane urea resin (U1) solution (solid content concentration of 36 mass %), 10.8 g of the following photochromic compound PC1, 43.2 g (12 parts by mass based on 100 parts by mass of U1) of an isomer mixture of 4,4'-methylenebis(cyclohexylisocyanate) as the component (IIIA), 10.8 g (3 parts by mass based on 100 parts by mass of U1) of an isocyanurate material of hexamethylene diisocyanate as the component (IIIB), 3.6 g of ethylenebis(oxyethylene)bis[3-(5-tert-butyl-4-hydroxy-m-tolyl)propionate as an antioxidant and 0.5 of DOW CORNING TORAY L-7001 as a surfactant were added, stirred and mixed together at room temperature to obtain an adhesive composition 1.

PC1: compound represented by the following formula

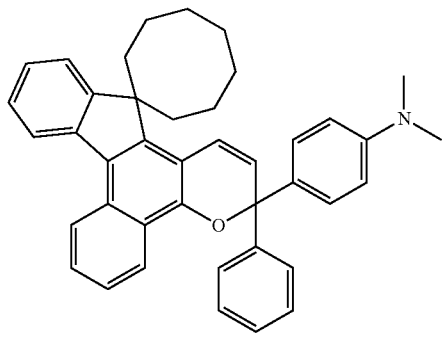 [SMILES: CN(C)c1ccc(C2(c3ccccc3)C=Cc3c4c(c5ccccc5c3O2)-c2ccccc2C42CCCCCCC2)cc1]

(3) Production of Laminate

The adhesive composition 1 obtained in (2) was applied to a 50 μm OPP film (stretched polypropylene film) by using a coater (manufactured by Tester Sangyo Co., Ltd.) at a coating speed of 0.3 m/min and dried at a temperature of 80° C. for 5 minutes to form an adhesive sheet made of the adhesive composition 1 and having a thickness of 40 μm. An alicyclic polyamide sheet (sheet containing an alicyclic polyamide composed of 4,4'-diaminodicyclohexylmethane and 1,10-decanedicarboxylic acid as the main component and having a retardation value of 10 nm, a Vicat softening point of 130° C., a glass transition point of 140° C. and a linear expansion coefficient of $0.9 \times 10^{-4}$ $K^{-1}$) having a thickness of 300 μm was bonded to the adhesive sheet made of the adhesive composition 1.

Then, the OPP film was peeled off from the laminate consisting of the alicyclic polyamide sheet, the adhesive sheet made of the adhesive composition 1 and the OPP film in this order and prepared by the above method. The same alicyclic polyamide sheet as above (thickness of 300 μm) was pressure contacted to the obtained structure by means of a lamination roll to ensure that the adhesive sheet of the structure was bonded to the aliphatic polyamide sheet. After the laminated sheet obtained as described above was left to stand at 60° C. under vacuum (500 Pa) for 12 hours (degassing step), it was heated at 90° C. for 1 hour (heating step). Further, it was humidified at 70° C. and 90% RH for 20 hours (humidifying step) and finally left to stand at 80° C. under vacuum (500 Pa) for 5 hours (moisture removing step) to obtain a laminate having photochromic properties.

As for the photochromic properties of the obtained laminate, the maximum absorption wavelength was 585 nm, the color optical density was 1.0, the fading speed was 45 seconds, and the durability was 93%. The peel strength at 25° C. was 100 N/25 mm, the peel strength in a 70° C. atmosphere was 70 N/25 mm, and the peel strength at 25° C. after a weatherability test was 50 N/25 mm. These evaluations were made as follows.

[Photochromic Properties]

The obtained laminate was used as a sample and exposed to light having a beam intensity on the surface of the laminate of 2.4 mW/cm² at 365 nm and 24 μW/cm² at 245 nm with the L-2480 (300 W) SHL-100 xenon lamp of Hamamatsu Photonics K.K. through an aero-mass filter (manufactured by Corning Incorporated) at 23° C. for 120 seconds to develop a color so as to measure the photochromic properties of the laminate.

1) Maximum absorption wavelength (λmax): Maximum absorption wavelength after color development obtained with the spectrophotometer (instantaneous multi-channel photodetector MCPD1000) of Otsuka Electronics Co., Ltd. The maximum absorption wavelength is connected with color tone at the time of color development.
2) Coloroptical density {ε(120)–ε(0)}: Difference between absorbance {ε(120)} after 120 seconds of exposure to light at the above maximum absorption wavelength and absorbance ε(0) at the time of unexposure at the maximum absorption wavelength. It can be said that as this value becomes larger, photochromic properties become more excellent.
3) Fading speed [t½ (sec.)]: Time elapsed until the absorbance at the above maximum absorption wavelength of the sample drops to ½ of [ε(120)–ε(0)} when exposure is continued for 120 seconds and then stopped. It can be said that as this time becomes shorter, photochromic properties become more excellent.
4) Durability (%)=[(A96/A0)×100]: The following accelerated deterioration test was conducted to evaluate color development durability by light irradiation. That is, the deterioration of the obtained optical laminate was accelerated for 96 hours by means of the X25 xenon weather meter of Suga Test Instruments Co., Ltd. Thereafter, the evaluation of the above color optical density was made before and after the test to measure color optical density (A0) before the test and color optical density (A96) after the test so as to take a value obtained from [(A96)/A0]×100] as the residual rate (%) which is an index of the durability of color development. As the residual rate becomes higher, the color development durability becomes higher.

[Peel Strength]

The obtained laminate was used as a test sample having a bonded part measuring 25×100 mm and put in a tester having a thermostatic oven in which a test atmospheric temperature can be set (Autograph AGS-500NX of Shimadzu Corporation) to carry out a tensile test at a crosshead speed of 100 mm/min so as to measure the following peel strengths 1) and 2).

1) The peel strength at 25° C. was measured as described above after the test sample cut out to the above size was left in the thermostatic oven set at 25° C. for 10 minutes (25° C. peel strength test result).
2) The peel strength in a 70° C. atmosphere was measured as described above after the test sample cut out to the above size was heated in the thermostatic oven set at 70° C. for 10 minutes (70° C. peel strength).
3) The test sample cut out to the above size was left in the QUV accelerated weathering tester of Q-LAB under exposure to radiation having an intensity of 0.89 W/cm² (340 nm) for 8 hours (lens surface temperature of about 60° C.) and then left under humidification for 4 hours (lens surface temperature of about 60° C.), and this test was carried out cycles (120 hours in total) to measure the peel strength in the same manner as in 1) (peel strength after durability test).

Table 1 shows the composition of the adhesive composition 1 and Table 2 shows the above evaluation results of the obtained laminate.

Example 2

(1) Production of Polyurethane Urea Resin (U2)/Production of Component (I)

The same urethan prepolymer as the urethane prepolymer produced in Example 1 was used, and a diethyl ketone solution of a polyurethane urea resin (U2) was obtained in the same manner as in Example 1 except that a mixed solution of 171 g of bis-(4-aminocyclohexyl)methane as a chain extender and 145 g of diethyl ketone was added dropwise within 15 minutes in (production of polyurethane urea resin (U1)/component (I)) of Example 1. The obtained polyurethane urea resin (U2) had a number average molecular weight of 18,500, a weight average molecular weight of 38,000, a polydispersity of 2.05, a softening point of 105° C. (softening start temperature; about 85° C.) and a kinetic viscosity of 14,000 cSt. Other results were the same production results of the polyurethane urea resin (U1) in Example 1.

(2) Preparation of Adhesive Composition, (3) Production and Evaluation of Laminate Then, a laminate was manufactured and evaluated in the same manner as in Example 1 except that the component (I) (the above polyurethane urea resin (U2)), the component (IIIA) and the component (IIIB) shown in Table 1 were used to prepare an adhesive composition 2. The evaluation results of the obtained laminate are shown in Table 2. Although the component (IIIA2) was used in Example 2, it was mixed with other components while butyl acetate was contained to prepare the adhesive composition 2. The amount of the component (IIIA2) shown in Table 1 is the amount of a trimer of isophorone diisocyanate which did not contain butyl acetate. When the component (IIIA2) was used in the following examples, the same operation as in Example 2 was carried out and the amount of the component (IIIA2) in tables was made the same as above.

Example 3

(1) Production of Polyurethane Urea Resin (U3)/Production of Component (I)

The same urethane prepolymer as the urethane prepolymer produced in Example 1 was used, and the same amounts of the same components as in (polyurethane urea resin (U1); production of component (I)) of Example 1 were used to produce a dimethyl ketone solution of a polyurethane urea resin (U3).

The polyurethane urea resin (U3) was produced in the same manner as in Example 1 except that the number of revolutions of the Maxblend blade at the time of starting the addition of bis-(4-aminocyclohexyl)methane which is a polyamine compound was 40 rpm, the Reynolds number (Re) was 192, the mixing time number ($n \cdot \theta_M$) was 38 from the $n \cdot \theta_M$-Re curve of the Maxblend blade and the complete mixing time ($\theta_M$) was seconds in the production of the polyurethane urea resin (U3).

The obtained polyurethane urea resin (U3) had a number average molecular weight of 20,000, a weight average molecular weight of 47,000, a polydispersity of 2.35, a softening point of 105° C. (softening start temperature; about 65° C.) and a kinetic viscosity of 30,000 cSt. Other results were the same production results of the polyurethane urea resin (U1) in Example 1.

(2) Preparation of Adhesive Composition, (3) Production and Evaluation of Laminate Then, a laminate was manufactured and evaluated in the same manner as in Example 1 except that the component (I) (the above polyurethane urea resin (U3)), the component (IIIA) and the component (IIIB) shown in Table 1 were used to prepare an adhesive composition 3. The evaluation results of the obtained laminate are shown in Table 2.

Example 4

(1) Production of Polyurethane Urea Resin (U4)/Production of Component (I)

2,000 g of a polycarbonate diol having a number average molecular weight of 800, 700 g of isophorone diisocyanate and 500 g of toluene were fed to the same reactor vessel as in Example 1 to carry out a reaction in a nitrogen atmosphere at 100° C. for 9 hours so as to synthesize a urethane prepolymer having an isocyanate group at the end. A diethyl ketone solution of a polyurethane urea resin (U4) was obtained by carrying out a reaction in the same manner as in Example 1 except that 110.5 g of bis-(4-aminocyclohexyl)methane was used as a chain extender. The obtained polyurethane urea resin (U4) had a number average molecular weight of 20,000, a weight average molecular weight of 42,000, a polydispersity of 2.10, a softening point of 100° C. (softening start temperature; about 75° C.) and a kinetic viscosity of 15,000 cSt.

The viscosity of the reaction solution at the start of adding dropwise bis-(4-aminocyclohexyl)methane which is a polyamine compound was 0.07 kg/m·s, the density was 950 kg/m$^3$, the number of revolutions of the Maxblend blade was 100 rpm, the Reynolds number (Re) was 412, the mixing time number ($n \cdot \theta_M$) was 20 from the $n \cdot \theta_M$-Re curve of the Maxblend blade and the complete mixing time ($\theta_M$) was 12 seconds.

(2) Preparation of Adhesive Composition, (3) Production and Evaluation of Laminate Then, a laminate was manufactured and evaluated in the same manner as in Example 1 except that the component (I) (the above polyurethane urea resin (U4)), the component (IIIA) and the component (IIIB) shown in Table 1 were used to prepare an adhesive composition 4. The evaluation results of the obtained laminate are shown in Table 2.

Example 5

(1) Production of Polyurethane Urea Resin (U5)/Production of Component (I)

1,550 g of a polycarbonate diol having a number average molecular weight of 800, 700 g of isophorone diisocyanate and 500 g of toluene were fed to the same reactor vessel as in Example 1 to carry out a reaction in a nitrogen atmosphere at 100° C. for 6 hours so as to synthesize a urethane prepolymer having an isocyanate group at the end. Then, a diethyl ketone solution of a polyurethane urea resin (U4) was obtained by carrying out a reaction in the same manner as in Example 1 except that 229.0 g of bis-(4-aminocyclohexyl)methane was used as a chain extender. The obtained polyurethane urea resin (U5) had a number average molecular weight of 20,000, a weight average molecular weight of 42,500, a polydispersity of 2.13, a softening point of 120° C. (softening start temperature; about 95° C.) and a kinetic viscosity of 16,000 cSt.

The viscosity of the reaction solution at the start of adding dropwise bis-(4-aminocyclohexyl)methane which is a polyamine compound was 0.05 kg/m·s, the density was 950 kg/m$^3$, the number of revolutions of the Maxblend blade was 100 rpm, the Reynolds number (Re) was 577, the mixing time number (n·θ$_M$) was 13 from the n·θ$_M$-Re curve of the Maxblend blade and the complete mixing time (θ$_M$) was 8 seconds.

(2) Preparation of Adhesive Composition, (3) Production and Evaluation of Laminate Then, a laminate was manufactured and evaluated in the same manner as in Example 1 except that the component (I) (the above polyurethane urea resin (U5)), the component (IIIA) and the component (IIIB) shown in Table 1 were used to prepare an adhesive composition 5. The evaluation results of the obtained laminate are shown in Table 2.

Examples 6 to 14, Comparative Examples 1 to 6

Laminates were manufactured and evaluated in the same manner as in Example 1 except that adhesive compositions 6 to 14 and comparative adhesive composition 1 to 6 were produced by using the component (I), the component (IIIA) and the component (IIIB) shown in Table 1. The evaluation results of the obtained laminates are shown in Table 2.

Comparative Example 7

(1) Synthesis of Polyurethane Resin for Comparative Adhesive Composition 7 (Two-Liquid Type Adhesive Composition)

A polyurethane resin (i) having an isocyanate group at the end of the molecular chain and a polyurethane resin (ii) having a hydroxyl group at the end of the molecular chain were synthesized by the following methods.

Synthesis of Polyurethane Resin (i)

100 g of a polycaprolactone polyol having a number average molecular weight of 1,000 (PLACCEL of Daicel Corporation) and 39.5 g of 4,4'-methylenebis(cyclohexylisocyanate) were fed to a three-necked flask having a stirring blade, a cooling tube, a thermometer and a nitrogen gas introduction tube to carry out a reaction in a nitrogen atmosphere at 90° C. for 6 hours so as to obtain a prepolymer having an isocyanate group at the end (polyurethane resin (i)). The molecular weight of the obtained prepolymer (polyurethane resin (i)) was 2,500 (theoretical value; 2,800) in terms of polyoxyethylene.

Synthesis of Polyurethane Resin (ii)

100 g of a polycaprolactone polyol having a number average molecular weight of 1,000 (PLACCEL of Daicel Corporation) and 61.3 g of hydrogenated diphenylmethane diisocyanate were fed to a three-necked flask having a stirring blade, a cooling tube, a thermometer and a nitrogen gas introduction tube to carry out a reaction in a nitrogen atmosphere at 90° C. for 6 hours so as to obtain a prepolymer having an isocyanate group at the end. After 300 g of toluene was added, 12.7 g of 1,4-butanediol was added dropwise in a nitrogen atmosphere and then a reaction was carried out at 90° C. for 24 hours after the addition to synthesize a polyurethane resin (ii) having a hydroxyl group at the end of the molecular chain. The molecular weight of the obtained polyurethane resin (ii) was 20,000 (theoretical value; 18,000) in terms of polyoxyethylene.

(2) Preparation of Comparative Adhesive Composition 7

175 g of the obtained polyurethane resin (i), 474 g of a polyurethane resin (ii) solution, 10.5 g of the photochromic compound PC1, 3.5 g of ethylenebis(oxyethylene)bis[3-(5-tert-butyl-4-hydroxy-m-tolyl)propionate] as an antioxidant and 0.4 g of DOW CORNING TORAY L-7001 as a surfactant were added, stirred and mixed together at room temperature to obtain a comparative adhesive composition 7.

(3) Production and Evaluation of Laminate

Then, a laminate was manufactured and evaluated in the same manner as in Example 1 except that the above comparative adhesive composition 7 was used. The evaluation results of the obtained laminate are shown in Table 2.

TABLE 1

| | Component (I) | | Component (III) Component (IIIa) | |
|---|---|---|---|---|
| Ex. No. | Component | amount (parts by mass) | Component | amount (parts by mass) *1 |
| Ex. 1 | U1 | 100 | (IIIA1) | 12 |
| Ex. 2 | U2 | 100 | (IIIA2) | 7.5 |
| Ex. 3 | U3 | 100 | (IIIA2) | 7.5 |
| Ex. 4 | U4 | 100 | (IIIA2) | 7.5 |
| Ex. 5 | U5 | 100 | (IIIA2) | 7.5 |
| Ex. 6 | U1 | 100 | (IIIA1) | 10 |
| Ex. 7 | U1 | 100 | (IIIA1) | 7.5 |
| Ex. 8 | U1 | 100 | (IIIA1) | 5 |
| Ex. 9 | U1 | 100 | (IIIA1) | 3 |
| Ex. 10 | U1 | 100 | (IIIA1) | 2.5 |
| Ex. 11 | U1 | 100 | (IIIA1) | 12 |
| Ex. 12 | U1 | 100 | (IIIA1) | 12 |
| Ex. 13 | U1 | 100 | (IIIA1) | 8 |
| Ex. 14 | U1 | 100 | (IIIA1) | 4 |

Ex. Example
*1; amount based on 100 parts by mass of component (I)

| | Component (III) | | | |
|---|---|---|---|---|
| | Component (IIIB) | | total amount of component (III) based on component (I) (parts by mass) *1 | Adhesive composition No. |
| Ex. No. | Component | amount (parts by mass) *1 | amount (parts by mass) *2 | | |
| Ex. 1 | (IIIB1) | 3 | 25 | 15 | A. Comp. 1 |
| Ex. 2 | (IIIB3) | 7.5 | 100 | 15 | A. Comp. 2 |
| Ex. 3 | (IIIB3) | 7.5 | 100 | 15 | A. Comp. 3 |
| Ex. 4 | (IIIB3) | 7.5 | 100 | 15 | A. Comp. 4 |
| Ex. 5 | (IIIB3) | 7.5 | 100 | 15 | A. Comp. 5 |
| Ex. 6 | (IIIB1) | 5 | 50 | 15 | A. Comp. 6 |
| Ex. 7 | (IIIB1) | 7.5 | 100 | 15 | A. Comp. 7 |
| Ex. 8 | (IIIB1) | 10 | 200 | 15 | A. Comp. 8 |
| Ex. 9 | (IIIB1) | 12 | 400 | 15 | A. Comp. 9 |
| Ex. 10 | (IIIB1) | 12.5 | 500 | 15 | A. Comp. 10 |
| Ex. 11 | (IIIB2) | 3 | 25 | 15 | A. Comp. 11 |
| Ex. 12 | (IIIB3) | 3 | 25 | 15 | A. Comp. 12 |
| Ex. 13 | (IIIB1) | 2 | 25 | 10 | A. Comp. 13 |
| Ex. 14 | (IIIB1) | 1 | 25 | 5 | A. Comp. 14 |

Ex.: Example
A. Comp.: Adhesive composition
*1; amount based on 100 parts by mass of component (I)
*2; amount of component (IIIB) based on 100 parts by mass of component (IIIA)

| | Component (I) | | Component (III) Component (IIIA) | |
|---|---|---|---|---|
| Ex. No. | Component | amount (parts by mass) | Component | amount (parts by mass) *1 |
| C. Ex. 1 | U1 | 100 | — | — |
| C. Ex. 2 | U1 | 100 | (IIIA1) | 10 |
| C. Ex. 3 | U1 | 100 | — | — |
| C. Ex. 4 | U1 | 100 | (IIIA1) | 14 |
| C. Ex. 5 | U1 | 100 | (IIIA1) | 1 |
| C. Ex. 6 | U1 | 100 | (IIIA1) | 24 |
| C. Ex. 7 | using two-liquid type adhesive composition (Comparative Adhesive composition 7) | | | |

TABLE 1-continued

C. Ex.: Comparative Example
*1; amount based on 100 parts by mass of component (I)

| | Component (III) | | | |
|---|---|---|---|---|
| | Component (IIIB) | | total amount of component (III) based on | |
| Ex. No. | Component | amount (parts by mass) *1 | amount (parts by mass) *2 | component (I) (parts by mass) *1 | Adhesive composition No. |
| C. Ex. 1 | — | — | — | 0 | C.A. Comp. 1 |
| C. Ex. 2 | — | — | 0 | 10 | C.A. Comp. 2 |
| C. Ex. 3 | (IIIB1) | 10 | — | 10 | C.A. Comp. 3 |
| C. Ex. 4 | (IIIB1) | 1 | 7.1 | 15 | C.A. Comp. 4 |
| C. Ex. 5 | (IIIB1) | 14 | 1400 | 15 | C.A. Comp. 5 |
| C. Ex. 6 | (IIIB1) | 6 | 25 | 30 | C.A. Comp. 6 |
| C. Ex. 7 | two-liquid type adhesive composition (Comparative Adhesive composition 7) | | | | C.A. Comp. 7 |

C. Ex.: Comparative Example
C.A. Comp.: Comparative Adhesive composition
*1; amount based on 100 parts by mass of component (I)
*2; amount of component (IIIB) based on 100 parts by mass of component (IIIA)

TABLE 2

| | | photochromic properties | | | | peel strength (N/25 mm) | | |
|---|---|---|---|---|---|---|---|---|
| Ex. No | A. Comp. No. | λ max (nm) | Color optical density | fading speed (second) | Durability (%) | 25° C. | 70° C. | after weatherability test |
| Ex. 1 | A. Comp. 1 | 585 | 1.0 | 45 | 93 | 100 | 70 | 50 |
| Ex. 2 | A. Comp. 2 | 585 | 1.0 | 45 | 93 | 140 | 170 | 120 |
| Ex. 3 | A. Comp. 3 | 585 | 1.0 | 45 | 93 | 140 | 150 | 110 |
| Ex. 4 | A. Comp. 4 | 585 | 1.0 | 41 | 90 | 130 | 140 | 100 |
| Ex. 5 | A. Comp. 5 | 585 | 1.0 | 50 | 94 | 160 | 160 | 120 |
| Ex. 6 | A. Comp. 6 | 585 | 1.0 | 45 | 93 | 120 | 100 | 90 |
| Ex. 7 | A. Comp. 7 | 585 | 1.0 | 45 | 93 | 150 | 160 | 120 |
| Ex. 8 | A. Comp. 8 | 585 | 1.0 | 45 | 93 | 160 | 160 | 120 |
| Ex. 9 | A. Comp. 9 | 585 | 1.0 | 46 | 92 | 110 | 100 | 90 |
| Ex. 10 | A. Comp. 10 | 585 | 1.0 | 47 | 92 | 100 | 70 | 60 |
| Ex. 11 | A. Comp. 11 | 585 | 1.0 | 45 | 93 | 100 | 80 | 50 |
| Ex. 12 | A. Comp. 12 | 585 | 1.0 | 45 | 93 | 100 | 80 | 60 |
| Ex. 13 | A. Comp. 13 | 585 | 1.0 | 45 | 93 | 90 | 60 | 40 |
| Ex. 14 | A. Comp. 14 | 585 | 1.0 | 45 | 93 | 80 | 50 | 30 |

Ex.: Example
A. Comp.: Adhesive composition

| | | photochromic properties | | | | peel strength (N/25 mm) | | |
|---|---|---|---|---|---|---|---|---|
| Ex. No | A. Comp. No. | λ max (nm) | Color optical density | fading speed (second) | Durability (%) | 25° C. | 70° C. | after weatherability test |
| C. Ex. 1 | C.A. Comp. 1 | 585 | 1.0 | 45 | 93 | 50 | 20 | 5 |
| C. Ex. 2 | C.A. Comp. 2 | 585 | 1.0 | 45 | 93 | 80 | 50 | 10 |
| C. Ex. 3 | C.A. Comp. 3 | 585 | 1.0 | 45 | 93 | 80 | 30 | 5 |
| C. Ex. 4 | C.A. Comp. 4 | 585 | 1.0 | 45 | 93 | 90 | 60 | 15 |
| C. Ex. 5 | C.A. Comp. 5 | 585 | 1.0 | 49 | 92 | 90 | 50 | 15 |
| C. Ex. 6 | C.A. Comp. 6 | 585 | 0.9 | 50 | 89 | 60 | 20 | 5 |
| C. Ex. 7 | C.A. Comp. 7 | 585 | 1.0 | 48 | 60 | 30 | 15 | 5 |

C. Ex.: Comparative Example
C.A. Comp.: Comparative Adhesive composition
A. Comp.: Adhesive composition Example 15

Preparation of Polarizing Sheet

A polyvinyl alcohol film (trade name: VF-PS #7500; manufactured by Kuraray Co., Ltd.) raw material having a thickness of 75 μm was dyed in a dyebath which was a mixed solution of 0.04% of iodine and 0.4% of potassium iodide (dye solution) kept at 30° C. while it was stretched to 3 times the length of the raw material. This film was further immersed in a 3.5% boric acid aqueous solution (stretch bath) to be stretched to 6 times, thereby producing a polarizing sheet 1 (thickness of 27 μm). The obtained polarizing sheet 1 had a luminous transmittance of 42.5% and a polarization degree of 99.2%.

Preparation of Adhesive Composition 15

The adhesive composition 1 comprising no photochromic compound PC1 was designated as an adhesive composition 15. That is, 1,000 g of a solution of the above polyurethane urea resin (U1) (solid content concentration of 36 mass %), 43.2 g (12 parts by mass based on 100 parts by mass of U1) of an isomer mixture of 4,4'-methylenebis(cyclohexylisocyanate) as the component (IIIA), 10.8 g (3 parts by mass based on 100 parts by mass of U1) of an isocyanurate material of hexamethylene diisocyanate as the component (IIIB) and 0.5 g of DOW CORNING TORAY L-7001 as a surfactant were added, stirred and mixed together at room temperature to obtain the adhesive composition 15. The composition of this adhesive composition 15 is shown in Table 3.

Manufacture of Laminate

The adhesive composition 15 was applied to an alicyclic polyamide sheet having a thickness of 100 μm (retardation value of 10 nm, Vicat softening point of 130° C., glass transition point of 140° C., linear expansion coefficient of $0.9 \times 10^{-4}$ $K^{-1}$) by using a coater (manufactured by Tester Sangyo Co., Ltd.) and dried at a temperature of 80° C. for 3 hours to obtain an alicyclic polyamide sheet having an adhesive sheet made of the adhesive composition 15 and having a thickness of 20 μm.

Then, two alicyclic polyamide sheets having this adhesive sheet and a polarizing sheet 1 produced by the above method were prepared and pressure contacted to each other by means of a lamination roll to ensure that the adhesive sheets of the alicyclic polyamide sheets having the adhesive sheet were bonded to both sides of the polarizing film, respectively.

Then, after the laminated sheet obtained as described above was left to stand under vacuum (500 Pa) at 60° C. for 12 hours (degassing step), it was heated at 90° C. for 1 hour (heating step). Further, it was humidified at 70° C. and 90% RH for 20 hours (humidification step) and finally left to stand under vacuum (500 Pa) at 80° C. for 5 hours (moisture removing step) to obtain a laminate having polarization characteristics.

The obtained laminate had a luminous transmittance of 41.0% and a polarization degree of 99.1%. Further, it had a peel strength at 25° C. of 90 N/25 mm, a peel strength in a 70° C. atmosphere of 60 N/25 mm and a peel strength at 25° C. after a weatherability test of 50 N/25 mm.

The luminous transmittance and polarization degree were evaluated as follows and the peel strengths were evaluated in the same manner as in Example 1.

[Luminous Transmittance]

The obtained laminate was used as a sample and measured for luminous transmittance by using the UV-2550 ultraviolet visible light spectrophotometer of Shimadzu Corporation.

[Polarization Degree]

The obtained laminate was used as a sample and measured for parallel transmittance (Tp) and orthogonal transmittance (Tc) by using the UV-2550 ultraviolet visible light spectrophotometer of Shimadzu Corporation to obtain the polarization degree from the following expression.

Polarization degree $(P)$ (%)=$\{(Tp-Tc)/(Tp+Tc)\}^{1/2} \times 100$

Tc and Tp are Y values which were measured by the 2-degree field of view of JIS Z 8701 (C light source) and corrected for visible sensitivity.

The evaluation results of the obtained laminate are shown in Table 4.

Examples 16 to 28, Comparative Examples 8 to 14

Laminates were manufactured in the same manner as in Example 15 except that adhesive compositions 16 to 28 comprising no photochromic compound PC1 and comparative adhesive compositions 8 to 14 were prepared by using the component (I), the component (IIIA) and the component (IIIB) shown in Table 3 and used. The evaluation results of the obtained laminates are shown in Table 4.

In Comparative Example 14, a two-liquid type adhesive composition (comparative adhesive composition 14) prepared by removing the photochromic compound PC1 from the two-liquid type comparative adhesive composition 7 used in Comparative Example 7 was used.

Example 29

The operation of Example 15 was repeated except that a laminate was manufactured by replacing the alicyclic polyamide sheet by an alicyclic polyamide sheet which had a thickness of 300 μm, a retardation value of 4,000 nm, a Vicat softening point of 130° C., a glass transition point of 140° C. and a linear expansion coefficient of $0.9 \times 10^{-4}$ $K^{-1}$ and was monoaxially stretched. The obtained laminate was evaluated in the same manner as in Example 15. The evaluation results of the obtained laminate are shown in Table 4.

TABLE 3

| Ex. No. | Component (I) Component | Component (I) amount (parts by mass) | Component (III) Component (IIIA) Component | Component (III) Component (IIIA) amount (parts by mass) *1 |
|---|---|---|---|---|
| Ex. 15 | U1 | 100 | (IIIA1) | 12 |
| Ex. 16 | U2 | 100 | (IIIA2) | 7.5 |
| Ex. 17 | U3 | 100 | (IIIA2) | 7.5 |
| Ex. 18 | U4 | 100 | (IIIA2) | 7.5 |
| Ex. 19 | U5 | 100 | (IIIA2) | 7.5 |
| Ex. 20 | U1 | 100 | (IIIA1) | 10 |
| Ex. 21 | U1 | 100 | (IIIA1) | 7.5 |
| Ex. 22 | U1 | 100 | (IIIA1) | 5 |
| Ex. 23 | U1 | 100 | (IIIA1) | 3 |
| Ex. 24 | U1 | 100 | (IIIA1) | 2.5 |
| Ex. 25 | U1 | 100 | (IIIA1) | 12 |
| Ex. 26 | U1 | 100 | (IIIA1) | 12 |
| Ex. 27 | U1 | 100 | (IIIA1) | 8 |

Ex. Example
*1; amount based on 100 parts by mass of component (I)

| Ex. No. | Component (III) Component (IIIB) Component | Component (IIIB) amount (parts by mass) *1 | Component (IIIB) amount (parts by mass) *2 | total amount of component (III) based on component (I) (parts by mass) *1 | Adhesive composition No. |
|---|---|---|---|---|---|
| Ex. 15 | (IIIB1) | 3 | 25 | 15 | A. Comp. 15 |
| Ex. 16 | (IIIB3) | 7.5 | 100 | 15 | A. Comp. 16 |
| Ex. 17 | (IIIB3) | 7.5 | 100 | 15 | A. Comp. 17 |
| Ex. 18 | (IIIB3) | 7.5 | 100 | 15 | A. Comp. 18 |
| Ex. 19 | (IIIB3) | 7.5 | 100 | 15 | A. Comp. 19 |
| Ex. 20 | (IIIB1) | 5 | 50 | 15 | A. Comp. 20 |
| Ex. 21 | (IIIB1) | 7.5 | 100 | 15 | A. Comp. 21 |
| Ex. 22 | (IIIB1) | 10 | 200 | 15 | A. Comp. 22 |
| Ex. 23 | (IIIB1) | 12 | 400 | 15 | A. Comp. 23 |
| Ex. 24 | (IIIB1) | 12.5 | 500 | 15 | A. Comp. 24 |
| Ex. 25 | (IIIB2) | 3 | 25 | 15 | A. Comp. 25 |
| Ex. 26 | (IIIB3) | 3 | 25 | 15 | A. Comp. 26 |
| Ex. 27 | (IIIB1) | 2 | 25 | 10 | A. Comp. 27 |

Ex.: Example
A. Comp.: Adhesive composition
*1; amount based on 100 parts by mass of component (I)
*2; amount of component (IIIB) based on 100 parts by mass of component (IIIA)

| Ex. No. | Component (I) Component | Component (I) amount (parts by mass) | Component (III) Component (IIIA) Component | Component (III) Component (IIIA) amount (parts by mass) *1 |
|---|---|---|---|---|
| Ex. 28 | U1 | 100 | (IIIA1) | 4 |
| Ex. 29 | U1 | 100 | (IIIA1) | 12 |
| C. Ex. 8 | U1 | 100 | — | — |
| C. Ex. 9 | U1 | 100 | (IIIA1) | 10 |
| C. Ex. 10 | U1 | 100 | — | — |

TABLE 3-continued

| Ex. No. | Component | amount (parts by mass) *1 | Component (IIIB) Component | amount (parts by mass) *1 | amount (parts by mass) *2 | total amount of component (III) based on component (I) (parts by mass) *1 | Adhesive composition No. |
|---|---|---|---|---|---|---|---|
| C. Ex. 11 | U1 | 100 | (IIIA1) | | | 14 | |
| C. Ex. 12 | U1 | 100 | (IIIA1) | | | 1 | |
| C. Ex. 13 | U1 | 100 | (IIIA1) | | | 24 | |
| C. Ex. 14 | using two-liquid type adhesive composition (Comparative Adhesive composition 14) | | | | | | |
| Ex. 28 | | | (IIIB1) | 1 | 25 | 5 | A. Comp. 28 |
| Ex. 29 | | | (IIIB1) | 3 | 25 | 15 | A. Comp. 15 |
| C. Ex. 8 | — | — | — | | | 0 | C. A. Comp. 8 |
| C. Ex. 9 | — | — | — | | | 0 | 10 C. A. Comp. 9 |
| C. Ex. 10 | | | (IIIB1) | 10 | — | 10 | C. A. Comp. 10 |
| C. Ex. 11 | | | (IIIB1) | 1 | 7.1 | 15 | C.A. Comp. 11 |
| C. Ex. 12 | | | (IIIB1) | 14 | 1400 | 15 | C.A. Comp. 12 |
| C. Ex. 13 | | | (IIIB1) | 6 | 25 | 30 | C.A. Comp. 13 |
| C. Ex. 14 | using two-liquid type adhesive composition (Comparative Adhesive composition 14) | | | | | | C.A. Comp. 14 |

Ex.: Example
C. Ex.: Comparative Example
A. Comp.: Adhesive composition
C.A. Comp.: Comparative Adhesive composition
*1; amount based on 100 parts by mass of component (I)
*2; amount of component (IIIB) based on 100 parts by mass of component (IIIA)

TABLE 4

| Ex. No. | Adhesive composition No. | luminous transmittance (%) | polarization degree (%) | peel strength (N/25 mm) 25° C. | peel strength (N/25 mm) 70° C. | peel strength (N/25 mm) after weatherability test |
|---|---|---|---|---|---|---|
| Ex. 15 | Adhesive composition 15 | 41.0 | 99.1 | 90 | 60 | 50 |
| Ex. 16 | Adhesive composition 16 | 41.0 | 99.1 | 140 | 130 | 100 |
| Ex. 17 | Adhesive composition 17 | 41.0 | 99.1 | 140 | 130 | 90 |
| Ex. 18 | Adhesive composition 18 | 41.0 | 99.0 | 120 | 120 | 90 |
| Ex. 19 | Adhesive composition 19 | 40.9 | 99.1 | 150 | 140 | 110 |
| Ex. 20 | Adhesive composition 20 | 41.0 | 99.0 | 120 | 100 | 80 |
| Ex. 21 | Adhesive composition 21 | 40.9 | 99.0 | 150 | 140 | 110 |
| Ex. 22 | Adhesive composition 22 | 41.0 | 99.0 | 150 | 150 | 110 |
| Ex. 23 | Adhesive composition 23 | 40.8 | 99.2 | 110 | 90 | 80 |
| Ex. 24 | Adhesive composition 24 | 40.8 | 99.0 | 100 | 80 | 60 |
| Ex. 25 | Adhesive composition 25 | 41.0 | 99.0 | 100 | 80 | 50 |
| Ex. 26 | Adhesive composition 26 | 41.2 | 99.0 | 90 | 70 | 50 |
| Ex. 27 | Adhesive composition 27 | 41.0 | 99.0 | 90 | 70 | 40 |
| Ex. 28 | Adhesive composition 28 | 41.0 | 99.0 | 80 | 60 | 30 |
| Ex. 29 | Adhesive composition 15 | 40.7 | 99.0 | 100 | 60 | 50 |
| C. Ex. 8 | C.A. composition 8 | 41.0 | 99.0 | 40 | 20 | 5 |
| C. Ex. 9 | C.A. composition 9 | 40.8 | 99.0 | 70 | 40 | 10 |
| C. Ex. 10 | C.A. composition 10 | 41.0 | 99.1 | 70 | 30 | 5 |
| C. Ex. 11 | C.A. composition 11 | 41.0 | 99.2 | 80 | 50 | 10 |
| C. Ex. 12 | C.A. composition 12 | 40.8 | 99.0 | 80 | 40 | 10 |
| C. Ex. 13 | C.A. composition 13 | 40.9 | 99.0 | 50 | 10 | 5 |
| C. Ex. 14 | C.A. composition 14 | 40.8 | 99.0 | 30 | 10 | 5 |

Ex.: Example
C. Ex.: Comparative Example
C.A. composition: Comparative Adhesive Composition

Example 30

Preparation of Adhesive Composition 29

The amount of the photochromic compound PC1 was changed in the adhesive composition 1. That is, 1,000 g of a solution of the above polyurethane urea resin (U1), 5.5 g of the photochromic compound PC1, 43.2 g (12 parts by mass based on 100 parts by mass of U1) of an isomer mixture of 4,4'-methylenebis(cyclohexylisocyanate) as the component (IIIA), 10.8 g (3 parts by mass based on 100 parts by mass of U1) of an isocyanurate material of hexamethylene diisocyanate as the component (IIIB), 3.6 g of ethylenebis(oxyethylene)bis[3-(5-tert-butyl-4-hydroxy-m-tolyl)propionate as an antioxidant and 0.5 g of DOW CORNING TORAY L-7001 as a surfactant were added, stirred and mixed together at room temperature to obtain an adhesive composition 29.

Manufacture of Laminate

The above adhesive compassion 29 was applied to an alicyclic polyamide sheet having a thickness of 100 μm (Vicat softening point of 130° C., glass transition point of 140° C. and linear expansion coefficient of $0.9 \times 10^{-4}$ $K^{-1}$) by using a coater (manufactured by Tester Sangyo Co., Ltd.) and dried at 80° C. for 3 minutes to obtain a first alicyclic polyamide sheet having an adhesive sheet made of the adhesive composition 29 and having a thickness of 40 μm.

Then, the adhesive composition 15 containing no photochromic compound produced in Example 15 was applied to an alicyclic polyamide sheet having a thickness of 100 μm (Vicat softening point of 130° C., glass transition point of 140° C. and linear expansion coefficient of $0.9 \times 10^{-4}$ $K^{-1}$) by using a coater (manufactured by Tester Sangyo Co., Ltd.) and dried at 80° C. for 3 minutes to obtain a second alicyclic polyamide sheet having an adhesive sheet made of the adhesive composition 15 and having a thickness of 40 μm.

The first and second alicyclic polyamide sheets produced as described above and the polarizing film produced in Example 15 were prepared and pressure contacted to each other by using a lamination roll to ensure that the adhesive sheets of the first and second alicyclic polyamide sheets were bonded to both sides of the polarizing film, respectively.

Then, after the laminated sheet obtained as described above was left to stand under vacuum (500 Pa) at 60° C. for 12 hours (degassing step), it was heated at 90° C. for 1 hour (heating step). Further, it was humidified at 70° C. and 90% RH for 20 hours (humidification step) and finally left to stand under vacuum (500 Pa) at 80° C. for 5 hours (moisture removing step) to obtain a laminate having photochromic properties and polarization characteristics.

The obtained laminate had a luminous transmittance of 40.8%, a polarization degree of 99.0%, a luminous transmittance of 11.0% at the time of color development as a photochromic property after exposure to ultraviolet radiation, a fading speed of 45 seconds and a durability of 93%. It had a peel strength at 25° C. of 90 N/25 mm, a peel strength in a 70° C. atmosphere of 70 N/25 mm and a peel strength at 25° C. after a weatherability test of 50 N/25 mm.

The above evaluations were made in the same manner as in Example 1 or Example 15 except for luminous transmittance at the time of color development as a photochromic property.

(Luminous Transmittance at the Time of Color Development)

After the obtained laminate was used as a sample and exposed to light having a beam intensity on the surface of the laminate of 2.4 mW/cm² at 365 nm and 24 μW/cm² at 245 nm with the L-2480 (300 W) SHL-100 xenon lamp of Hamamatsu Photonics K.K. through an aero-mass filter (manufactured by Corning Incorporated) at 23° C. for 120 seconds to develop a color, the luminous transmittance was measured with the spectrophotometer (instantaneous multi-channel photodetector MCPD1000) of Otsuka Electronics Co., Ltd.

The adhesive composition used in the obtained laminate is shown in Table 5, and the evaluation results of the obtained laminate are shown in Table 6.

Examples 31 to 33

In Example 31, a laminate was manufactured and evaluated in the same manner as in Example 30 except that the adhesive composition 30 comprising 5.5 g of the photochromic compound PC1 in Example 4 and the adhesive composition 18 produced in Example 18 were used.

In Example 32, a laminate was manufactured and evaluated in the same manner as in Example 30 except that the adhesive composition 31 comprising 5.5 g of the photochromic compound PC1 in Example 5 and the adhesive composition 19 produced in Example 19 were used.

In Example 33, a laminate was manufactured and evaluated in the same manner as in Example 30 except that the adhesive composition 32 comprising 5.5 g of the photochromic compound PC1 in Example 6 and the adhesive composition 20 produced in Example 20 were used.

The adhesive compositions used in the obtained laminates are shown in Table 5, and the evaluation results of the obtained laminates are shown in Table 6.

Example 34

The operation of Example 30 was repeated except that a laminate was manufactured by replacing the alicyclic polyamide sheet by an alicyclic polyamide sheet which had a thickness of 300 μm, a retardation value of 4,000 nm, a Vicat softening point of 130° C., a glass transition point of 140° C. and a linear expansion coefficient of $0.9 \times 10^{-4}$ $K^{-1}$ and was monoaxially stretched. The obtained laminate was evaluated in the same manner as in Example 30. The adhesive composition used in the obtained laminate is shown in Table 5, and the evaluation results of the obtained laminate are shown in Table 6.

TABLE 5

| Ex. No. | Adhesive composition comprising photochromic compound | Adhesive composition comprising no photochromic compound |
|---|---|---|
| Ex. 30 | Adhesive composition 29 | Adhesive composition 15 |
| Ex. 31 | Adhesive composition 30 | Adhesive composition 18 |
| Ex. 32 | Adhesive composition 31 | Adhesive composition 19 |
| Ex. 33 | Adhesive composition 32 | Adhesive composition 20 |
| Ex. 34 | Adhesive composition 29 | Adhesive composition 15 |

Ex.: Example

TABLE 6

| | | | photochromic properties | | | peel strength (N/25 mm) | | |
|---|---|---|---|---|---|---|---|---|
| | | | Luminous transmittance | | | | | |
| Ex. No | Luminous transmittance (%) | polarization degree (%) | at the time of color development (%) | fading speed (seconds) | durability (%) | 25° C. | 70° C. | after weatherability test |
| Ex. 30 | 40.8 | 99.0 | 11.0 | 45 | 93 | 90 | 70 | 50 |
| Ex. 31 | 41.0 | 99.0 | 11.0 | 45 | 93 | 120 | 100 | 70 |
| Ex. 32 | 40.9 | 99.0 | 11.0 | 45 | 93 | 150 | 140 | 110 |
| Ex. 33 | 41.0 | 99.0 | 11.0 | 45 | 93 | 160 | 150 | 120 |
| Ex. 34 | 40.7 | 99.0 | 11.0 | 45 | 93 | 100 | 80 | 60 |

Ex.: Example

Examples 35 to 48

Laminates were manufactured in the same manner as in Example 15 except that a polarizing sheet 2 containing a dichroic dye and having a luminous transmittance of 39.2% and a polarization degree of 99.5% was used in place of the polarizing sheet 1 used in Example 15 and an adhesive composition comprising the component (I), component (IIIA) and component (IIIB) but not the photochromic compound PC1 shown in Table 7 was used. The evaluation results of the obtained laminates are shown in Table 8.

Example 49

The operation of Example 35 was repeated except that a laminate was manufactured by replacing the alicyclic polyamide sheet by an alicyclic polyamide sheet which had a thickness of 300 μm, a retardation value of 4,000 nm, a Vicat softening point of 130° C., a glass transition point of 140° C. and a linear expansion coefficient of $0.9 \times 10^{-4}$ $K^{-1}$ and was monoaxially stretched. The obtained laminate was evaluated in the same manner as in Example 35. The amounts of the components of the adhesive composition are shown in Table 7. The evaluation results of the obtained laminate are shown in Table 8.

Example 50

The operation of Example 35 was repeated except that a laminate was manufactured by replacing the alicyclic polyamide sheet by a polycarbonate sheet which had a thickness of 300 μm and a retardation value of about 4,500 nm and was monoaxially stretched. The obtained laminate was evaluated in the same manner as in Example 35. The amounts of the components of the adhesive composition are shown in Table 7. The evaluation results of the obtained laminate are shown in Table 8.

Example 51

The operation of Example 50 was repeated except that a polarizing sheet 3 having a luminous transmittance of 27.0% and a polarization degree of 92.8% and containing a dichroic dye was used in place of the polarizing sheet 2 used in Example 50. The obtained laminate was evaluated in the same manner as in Example 50. The amounts of the components of the adhesive composition are shown in Table 7. The evaluation results of the obtained laminate are shown in Table 8.

TABLE 7

| | Component (I) | | Component (III) Component (IIIA) | |
|---|---|---|---|---|
| Ex. No. | Component | amount (parts by mass) | Component | amount (parts by mass) *1 |
| Ex. 35 | U1 | 100 | (IIIA1) | 12 |
| Ex. 36 | U2 | 100 | (IIIA2) | 7.5 |
| Ex. 37 | U3 | 100 | (IIIA2) | 7.5 |
| Ex. 38 | U4 | 100 | (IIIA2) | 7.5 |
| Ex. 39 | U5 | 100 | (IIIA2) | 7.5 |
| Ex. 40 | U1 | 100 | (IIIA1) | 10 |
| Ex. 41 | U1 | 100 | (IIIA1) | 7.5 |
| Ex. 42 | U1 | 100 | (IIIA1) | 5 |
| Ex. 43 | U1 | 100 | (IIIA1) | 3 |
| Ex. 44 | U1 | 100 | (IIIA1) | 2.5 |

Ex. Example
*1; amount based on 100 parts by mass of component (I)

| | Component (III) | | | |
|---|---|---|---|---|
| | Component (IIIB) | | total amount of component (III) based on component (I) (parts by mass) *1 | Adhesive composition No. |
| Ex. No. | Component | amount (parts by mass) *1 | amount (parts by mass) *2 | | |
| Ex. 35 | (IIIB1) | 3 | 25 | 15 | A. Comp. 15 |
| Ex. 36 | (IIIB3) | 7.5 | 100 | 15 | A. Comp. 16 |
| Ex. 37 | (IIIB3) | 7.5 | 100 | 15 | A. Comp. 17 |
| Ex. 38 | (IIIB3) | 7.5 | 100 | 15 | A. Comp. 18 |
| Ex. 39 | (IIIB3) | 7.5 | 100 | 15 | A. Comp. 19 |
| Ex. 40 | (IIIB1) | 5 | 50 | 15 | A. Comp. 20 |
| Ex. 41 | (IIIB1) | 7.5 | 100 | 15 | A. Comp. 21 |
| Ex. 42 | (IIIB1) | 10 | 200 | 15 | A. Comp. 22 |
| Ex. 43 | (IIIB1) | 12 | 400 | 15 | A. Comp. 23 |
| Ex. 44 | (IIIB1) | 12.5 | 500 | 15 | A. Comp. 24 |

Ex.: Example
A. Comp.: Adhesive composition
*1; amount based on 100 parts by mass of component (I)
*2; amount of component (IIIB) based on 100 parts by mass of component (IIIA)

| | Component (I) | | Component (III) Component (IIIA) | |
|---|---|---|---|---|
| Ex. No. | Component | amount (parts by mass) | Component | amount (parts by mass) *1 |
| Ex. 45 | U1 | 100 | (IIIA1) | 12 |
| Ex. 46 | U1 | 100 | (IIIA1) | 12 |
| Ex. 47 | U1 | 100 | (IIIA1) | 8 |
| Ex. 48 | U1 | 100 | (IIIA1) | 4 |
| Ex. 49 | U1 | 100 | (IIIA1) | 12 |

TABLE 7-continued

| Ex. 50 | U1 | 100 | (IIIA1) | 12 |
| Ex. 51 | U1 | 100 | (IIIA1) | 12 |

Ex. Example
*1; amount based on 100 parts by mass of component (I)

Component (III)

| Ex. No. | Component (IIIB) Component | amount (parts by mass) *1 | amount (parts by mass) *2 | total amount of component (III) based on component (I) (parts by mass) *1 | Adhesive composition No. |
|---|---|---|---|---|---|
| Ex. 45 | (IIIB2) | 3 | 25 | 15 | A. Comp. 25 |
| Ex. 46 | (IIIB3) | 3 | 25 | 15 | A. Comp. 26 |
| Ex. 47 | (IIIB1) | 2 | 25 | 10 | A. Comp. 27 |
| Ex. 48 | (IIIB1) | 1 | 25 | 5 | A. Comp. 28 |
| Ex. 49 | (IIIB1) | 3 | 25 | 15 | A. Comp. 15 |
| Ex. 50 | (IIIB1) | 3 | 25 | 15 | A. Comp. 15 |
| Ex. 51 | (IIIB1) | 3 | 25 | 15 | A. Comp. 15 |

Ex.: Example
A. Comp.: Adhesive composition
*1; amount based on 100 parts by mass of component (I)
*2; amount of component (IIIB) based on 100 parts by mass of component (IIIA)

TABLE 8

| Ex. No. | Adhesive composition No. | luminous transmittance (%) | polarization degree (%) | peel strength (N/25 mm) | | after weatherability test |
|---|---|---|---|---|---|---|
| | | | | 25° C. | 70° C. | |
| Ex. 35 | Adhesive composition 15 | 39.1 | 99.3 | 100 | 70 | 50 |
| Ex. 36 | Adhesive composition 16 | 39.1 | 99.3 | 140 | 130 | 110 |
| Ex. 37 | Adhesive composition 17 | 39.1 | 99.3 | 140 | 130 | 100 |
| Ex. 38 | Adhesive composition 18 | 39.1 | 99.2 | 120 | 120 | 100 |
| Ex. 39 | Adhesive composition 19 | 39.0 | 99.3 | 150 | 140 | 120 |
| Ex. 40 | Adhesive composition 20 | 39.1 | 99.2 | 120 | 110 | 90 |
| Ex. 41 | Adhesive composition 21 | 39.0 | 99.2 | 150 | 140 | 110 |
| Ex. 42 | Adhesive composition 22 | 39.1 | 99.2 | 150 | 150 | 110 |
| Ex. 43 | Adhesive composition 23 | 38.9 | 99.4 | 110 | 90 | 80 |
| Ex. 44 | Adhesive composition 24 | 38.9 | 99.2 | 100 | 90 | 60 |

Ex.: Example

| Ex. No. | Adhesive composition No. | luminous transmittance (%) | polarization degree (%) | peel strength (N/25 mm) | | after weatherability test |
|---|---|---|---|---|---|---|
| | | | | 25° C. | 70° C. | |
| Ex. 45 | Adhesive composition 25 | 39.1 | 99.2 | 100 | 80 | 50 |
| Ex. 46 | Adhesive composition 26 | 39.3 | 99.2 | 90 | 70 | 50 |
| Ex. 47 | Adhesive composition 27 | 39.1 | 99.2 | 90 | 70 | 40 |
| Ex. 48 | Adhesive composition 28 | 39.1 | 99.2 | 80 | 60 | 30 |
| Ex. 49 | Adhesive composition 15 | 38.8 | 99.2 | 100 | 70 | 60 |
| Ex. 50 | Adhesive composition 15 | 38.8 | 99.2 | 100 | 70 | 60 |
| Ex. 51 | Adhesive composition 15 | 26.5 | 99.7 | 100 | 70 | 60 |

Ex.: Example

Examples 52 to 55

In Example 52, a laminate was manufactured and evaluated in the same manner as in Example 30 except that the polarizing sheet 2 containing a dichroic dye used in Example 35, the adhesive composition 29 comprising 5.5 g of the photochromic compound PC1 in Example 1 and the adhesive composition 15 produced in Example 15 were used.

In Example 53, a laminate was manufactured and evaluated in the same manner as in Example 30 except that the polarizing sheet 2 containing a dichroic dye used in Example 35, the adhesive composition 30 comprising 5.5 g of the photochromic compound PC1 in Example 4 and the adhesive composition 18 produced in Example 18 were used.

In Example 54, a laminate was manufactured and evaluated in the same manner as in Example 30 except that the polarizing sheet 2 containing a dichroic dye used in Example 35, the adhesive composition 31 comprising 5.5 g of the photochromic compound PC1 in Example 5 and the adhesive composition 19 produced in Example 19 were used.

In Example 55, a laminate was manufactured and evaluated in the same manner as in Example 30 except that the polarizing sheet 2 containing a dichroic dye used in Example 35, the adhesive composition 32 comprising 5.5 g of the photochromic compound PC1 in Example 6 and the adhesive composition 20 produced in Example 20 were used.

The adhesive compositions used in the obtained laminates are shown in Table 9, and the evaluation results of the obtained laminates are shown in Table 10.

Example 56

The operation of Example 52 was repeated except that a laminate was manufactured by replacing the alicyclic polyamide sheet by an alicyclic polyamide sheet which had a thickness of 300 μm and a retardation value of 4,000 nm and was monoaxially stretched. The obtained laminate was evaluated in the same manner as in Example 52. The adhesive composition used in the obtained laminate is shown in Table 9, and the evaluation results of the obtained laminate are shown in Table 10.

Example 57(1)

The operation of Example 52 was repeated except that a laminate was manufactured by replacing the alicyclic polyamide sheet by a polycarbonate sheet which had a thickness of 300 μm and a retardation value of about 4,500 nm and was monoaxially stretched. The obtained laminate was evaluated in the same manner as in Example 52. The evaluation results of the obtained laminate are shown in Table 10.

Example 57(2)

In Example 57(2), the operation of Example 52 was repeated except that a laminate was manufactured by using the polarizing sheet 2 containing a dichroic dye used in Example 35, the adhesive composition 32 comprising 5.5 g of the photochromic compound PC1 in Example 8 and the adhesive composition 22 produced in Example 22 and by replacing the alicyclic polyamide sheet by a polycarbonate sheet which had a thickness of 300 μm and a retardation value of about 4,500 nm and was monoaxially stretched. The obtained laminate was evaluated in the same manner as in Example 52. The evaluation results of the obtained laminate are shown in Table 10.

TABLE 9

| Ex. No. | Adhesive composition comprising photochromic compound | Adhesive composition comprising no photochromic compound |
|---|---|---|
| Ex. 52 | Adhesive composition 29 | Adhesive composition 15 |
| Ex. 53 | Adhesive composition 30 | Adhesive composition 18 |
| Ex. 54 | Adhesive composition 31 | Adhesive composition 19 |
| Ex. 55 | Adhesive composition 32 | Adhesive composition 20 |
| Ex. 56 | Adhesive composition 29 | Adhesive composition 15 |
| Ex. 57(1) | Adhesive composition 29 | Adhesive composition 15 |
| Ex. 57(2) | Adhesive composition 32 | Adhesive composition 22 |

Ex.: Example the adhesive composition of the present invention are unsatisfactory in terms of adhesion

Example 58

Bending of Laminate

After a two-layer protective film (total thickness of 80 μm) consisting of a polyethylene layer and a polypropylene layer was attached to both sides of the laminate obtained in Example 1, a disk-like sheet having a diameter of 80 mm was obtained by using a Thomson blade (twin blade, blade angle of 42°). The obtained disk-like sheet was bent into a spherical shape by vacuum suction processing (thermal bending). The vacuum suction processing was carried out by placing a recessed mold having a diameter of 90 mm in a 150° C. atmosphere and carrying out vacuum suction from a hole at the center of the recessed mold by a vacuum pump. The processing time was about 2 minutes, and a laminate formed into a spherical shape was obtained by removing from the mold.

Production of Optical Article by Injection Molding

After the protective films existent on both sides of the obtained laminate having a spherical shape were peeled off, the laminate was placed on the recessed surface of the mold of an injection molding machine and heated at 100° C. After the above mold was closed, a polyamide resin (TROGAMID CX7323) which was melt kneaded at 280° C. was injected at a pressure of 200 MPa to mold a lens having photochromic properties (optical article).

As for the photochromic properties of the obtained lens having photochromic properties, the lens had a maximum absorption wavelength of 586 nm, a color optical density of 1.0, a fading speed of 46 seconds and a durability of 93%.

Example 59

A lens was molded in the same manner as in Example 58 except that the laminate obtained in Example 15 was used. A lens having polarization characteristics was molded in Example 59.

TABLE 10

| | | | photochromic properties | | | peel strength (N/25 mm) | | |
|---|---|---|---|---|---|---|---|---|
| Ex. No | Luminous transmittance (%) | polarization degree (%) | Luminous transmittance at the time of color development (%) | fading speed (seconds) | durability (%) | 25° C. | 70° C. | after weatherability test |
| Ex. 52 | 39.0 | 99.2 | 10.5 | 45 | 93 | 100 | 80 | 60 |
| Ex. 53 | 39.2 | 99.2 | 10.5 | 45 | 93 | 120 | 100 | 80 |
| Ex. 54 | 39.1 | 99.2 | 10.5 | 45 | 93 | 150 | 140 | 120 |
| Ex. 55 | 39.2 | 99.2 | 10.5 | 45 | 93 | 160 | 150 | 130 |
| Ex. 56 | 38.9 | 99.3 | 10.5 | 45 | 93 | 100 | 90 | 60 |
| Ex. 57 (1) | 38.9 | 99.3 | 10.5 | 45 | 93 | 100 | 90 | 60 |
| Ex. 57 (2) | 39.0 | 99.3 | 10.5 | 45 | 93 | 130 | 120 | 90 |

Ex.: Example

As obvious from the above Examples 1 to 57, it is understood that the laminate of the present invention containing the adhesive composition of the present invention exhibits excellent photochromic properties and polarization characteristics in each sheet and has excellent adhesion, especially adhesion at a high temperature and after a weatherability test.

Meanwhile, as shown in Comparative Examples 1 to 14, the laminates containing an adhesive composition other than The obtained lens having polarization characteristics had a luminous transmittance of 40.8% and a polarization degree of 99.1%.

Example 60

A lens was molded in the same manner as in Example 35 except that the laminate obtained in Example 30 was used.

A lens having polarization characteristics and photochromic properties was molded in Example 60.

The obtained lens having polarization characteristics and photochromic properties had a luminous transmittance of 40.8% and a polarization degree of 99.0% as well as a luminous transmittance at the time of color development of 11.0%, a fading speed of 45 seconds and a durability of 93% as photochromic properties after exposure to ultraviolet radiation.

EXPLANATION OF REFERENCE NUMERALS 1 alicyclic polyamide resin sheet
1' alicyclic polyamide resin sheet
2 adhesive layer made of adhesive composition
2' adhesive layer made of adhesive composition comprising a coloring matter
3 polarizing sheet

The invention claimed is:

1. A laminate comprising a pair of alicyclic polyamide resin sheets which are bonded together through an adhesive layer made of an adhesive composition;
   wherein the adhesive composition comprises:
   (I) 100 parts by mass of an end-unreactive urethane urea resin; and
   (III) 4.0 to 20 parts by mass of a polyisocyanate compound having at least two isocyanate groups in the molecule, wherein
   the polyisocyanate compound (III) contains (IIIA) a polyisocyanate compound having an isocyanate group bonded to secondary carbon and (IIIB) a polyisocyanate compound having 4 to 40 carbon atoms in the molecule other than the component (IIIA), and the amount of the component (IIIB) is 10 to 500 parts by mass based on 100 parts by mass of the component (IIIA);
   wherein the component (IIIB) is at least one polyisocyanate compound selected from the group consisting of biuret compounds of hexamethylene diisocyanate, isocyanurate compounds of hexamethylene diisocyanate and adduct compounds of hexamethylene diisocyanate.

2. A laminate comprising a polarizing sheet which is existent between a pair of alicyclic polyamide resin sheets and bonded to the alicyclic polyamide resin sheets through an adhesive layer made of an adhesive composition;
   wherein the adhesive composition comprises:
   (I) 100 parts by mass of an end-unreactive urethane urea resin; and
   (III) 4.0 to 20 parts by mass of a polyisocyanate compound having at least two isocyanate groups in the molecule, wherein
   the polyisocyanate compound (III) contains (IIIA) a polyisocyanate compound having an isocyanate group bonded to secondary carbon and (IIIB) a polyisocyanate compound having 4 to 40 carbon atoms in the molecule other than the component (IIIA), and the amount of the component (IIIB) is 10 to 500 parts by mass based on 100 parts by mass of the component (IIIA);
   wherein the component (IIIB) is at least one polyisocyanate compound selected from the group consisting of biuret compounds of hexamethylene diisocyanate, isocyanurate compounds of hexamethylene diisocyanate and adduct compounds of hexamethylene diisocyanate.

3. An optical article manufactured by further laminating a polyamide resin layer on the surface of at least one of the alicyclic polyamide resin sheets in the laminate of claim 1.

4. The laminate of claim 1, wherein the weight average molecular weight/number average molecular weight ratio which indicates the polydispersity of the component (I) is 1.6 to 2.4.

5. The laminate of claim 1, wherein the adhesive composition further comprises (II) a coloring matter.

6. The laminate of claim 5, wherein the coloring matter (II) contains a photochromic compound.

* * * * *